United States Patent
Owen

(10) Patent No.: US 7,710,602 B2
(45) Date of Patent: May 4, 2010

(54) SYSTEMS AND METHODS FOR CONTEXT-BASED ADAPTIVE IMAGE PROCESSING USING SEGMENTATION

(75) Inventor: James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1162 days.

(21) Appl. No.: 10/404,201

(22) Filed: Mar. 31, 2003

(65) Prior Publication Data

US 2004/0190067 A1 Sep. 30, 2004

(51) Int. Cl.
*G06K 15/00* (2006.01)
*G06K 9/34* (2006.01)

(52) U.S. Cl. .................. 358/2.1; 358/1.9; 358/3.24; 358/518; 358/534; 358/3.26; 358/3.27; 358/3.06; 382/164; 382/175; 382/176; 382/177; 382/178

(58) Field of Classification Search .............. 358/2.1, 358/3.24–3.27, 15, 3.14, 462, 1.9, 3.26, 518, 358/528, 515, 401, 327, 532, 443, 447, 448, 358/534, 3.06, 452; 347/5, 43, 114; 382/167, 382/162, 173, 176, 229, 224, 254, 260–266, 382/275, 164, 175, 177, 178, 179
See application file for complete search history.

(56) References Cited

U.S. PATENT DOCUMENTS

| | | | |
|---|---|---|---|
| 5,504,842 A | * | 4/1996 | Gentile ................. 358/1.15 |
| 5,579,446 A | | 11/1996 | Naik et al. |
| 5,704,021 A | | 12/1997 | Smith et al. |
| 5,731,823 A | | 3/1998 | Miller et al. |
| 5,850,504 A | * | 12/1998 | Cooper et al. ........... 358/1.18 |
| 5,870,535 A | * | 2/1999 | Duffin et al. ............ 358/1.16 |
| 6,006,013 A | * | 12/1999 | Rumph et al. ........... 358/1.15 |
| 6,040,927 A | | 3/2000 | Winter et al. |
| 6,070,969 A | * | 6/2000 | Buonanno .................. 347/64 |
| 6,295,538 B1 | * | 9/2001 | Cooper et al. ........... 707/104.1 |
| 6,529,902 B1 | * | 3/2003 | Kanevsky et al. ............ 707/5 |
| 6,801,661 B1 | * | 10/2004 | Sotak et al. .............. 382/203 |
| 7,057,764 B1 | * | 6/2006 | Sakaue .................... 358/1.9 |
| 2002/0097456 A1 | * | 7/2002 | Yamada et al. ............ 358/536 |

FOREIGN PATENT DOCUMENTS

JP 04-013369 * 5/1990

* cited by examiner

*Primary Examiner*—King Y Poon
*Assistant Examiner*—Steven Kau
(74) *Attorney, Agent, or Firm*—Krieger Intellectual Property, Inc.; Scott C. Krieger

(57) ABSTRACT

Embodiments of the present invention comprise methods and systems for context-based adaptive image processing wherein print job elements are processed according to context, which may be determined by segmentation and analysis of print job elements.

8 Claims, 19 Drawing Sheets

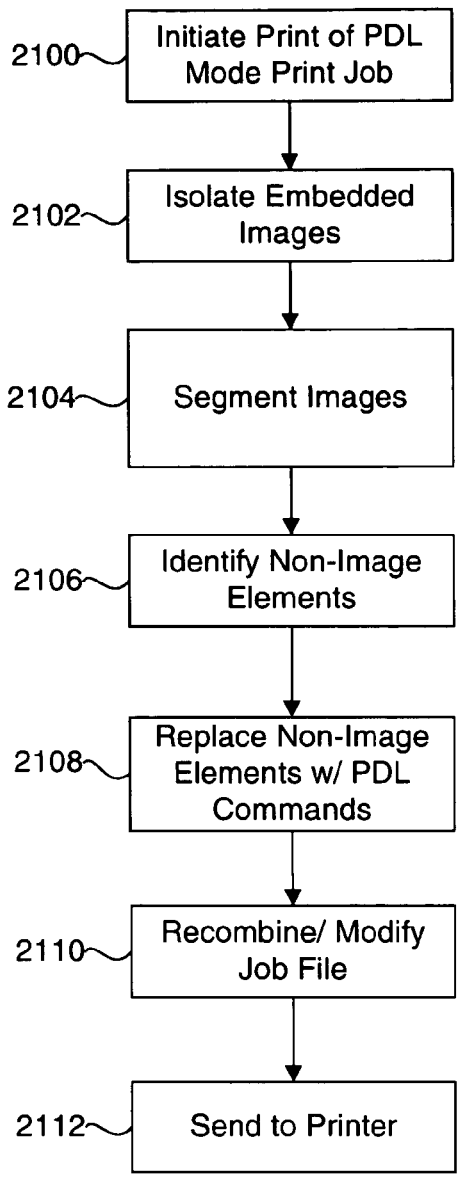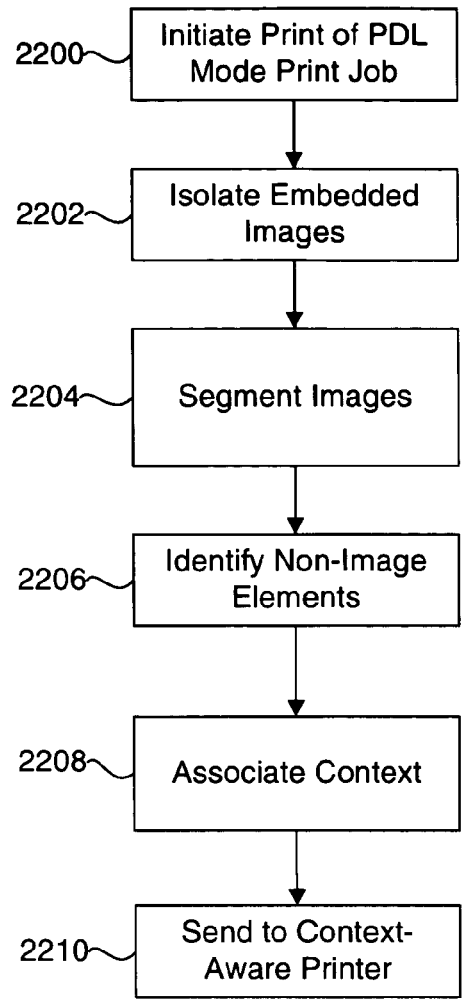
FIG. 21
FIG. 22

SYSTEMS AND METHODS FOR CONTEXT-BASED ADAPTIVE IMAGE PROCESSING USING SEGMENTATION

BACKGROUND

Many computer applications allow different types of graphical elements to be combined into one document. For example, a word processing document may contain images imported from a digital camera, charts and graphs taken from a spreadsheet, drawings imported from a drawing program, etc. These graphical elements may have varying types including color characteristics. Some elements may be black-and-white, grayscale or monochrome while others may employ one or more of various color formats.

For optimal processing, each type of graphical element is processed differently. All elements of a single document may be processed in the same manner, however this will result in some elements being processed optimally while others suffer from sub-optimal processing. Accordingly, a method for processing each graphical element in a document by that element type's optimal processing method is desirable.

SUMMARY OF THE INVENTION

The methods and systems of embodiments of the present invention comprise context-based adaptive image processing. A graphical element type may be referred to as a context and each context may be assigned a processing method such as a rendering algorithm or other processing algorithm. According to the context-based adaptive image processing of some embodiments of the present invention, a document may be analyzed and divided into its graphical elements with each set of elements being identified by context or type. Once the elements of each context are identified, each element may be processed using context-specific processes.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 21 is a block diagram illustrating an alternative method of context-based print processing;

FIG. 22 is a block diagram illustrating an alternative method of context-based print processing.

DETAILED DESCRIPTION

Figure 1:
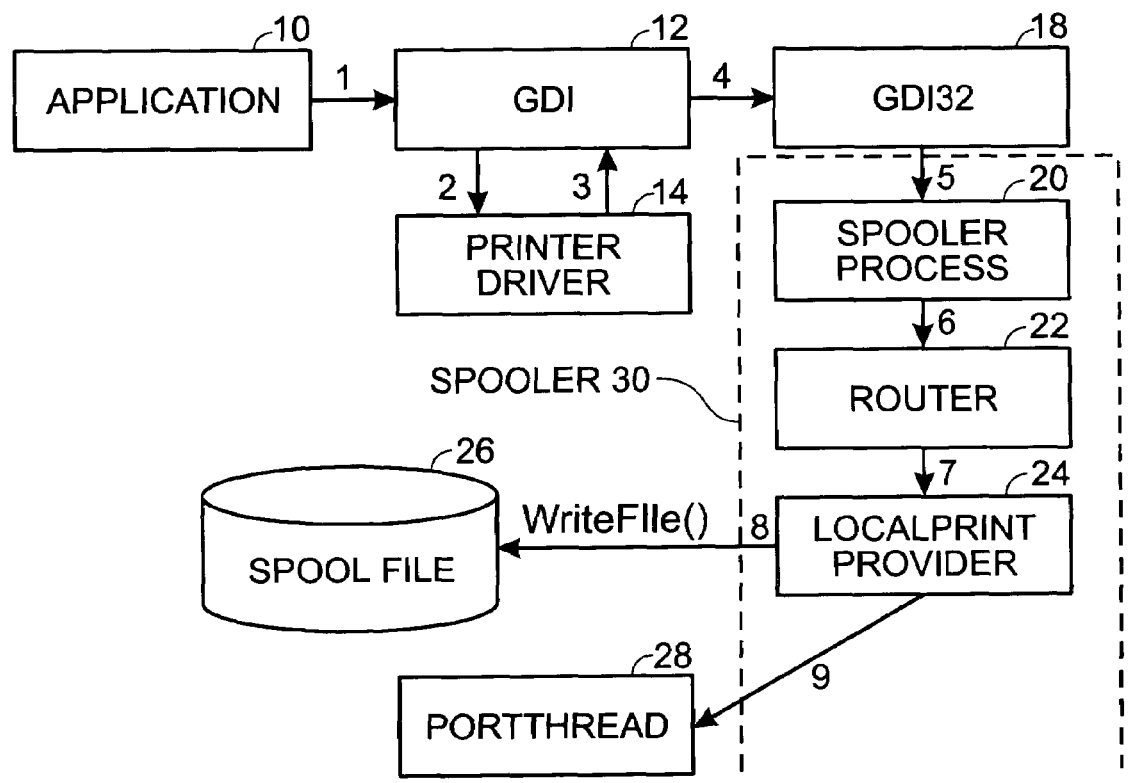
FIG. 1 is a diagram depicting a typical prior art printing process using a raw spool file.

It will be readily understood that the components of the embodiments as generally described and illustrated in the Figures herein could be arranged and designed in a wide variety of different configurations. Thus, the following more detailed description of the embodiments of the methods and apparatus of the present invention, as represented in the Figures, is not intended to limit the scope of the invention, as claimed, but is merely representative of the embodiments of the invention.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Functions of elements of embodiments of the present invention may be implemented through the use of custom print drivers, custom print processors, custom print spoolers, other custom print system components, other applications, independent firmware or hardware or printer firmware or hardware. Special print drivers may be used to implement custom printing features, however print drivers are printer specific. Each printer or group of closely-related printers must have its own driver, therefore, implementing special features across a variety of printing devices requires the customization of a multitude of print drivers. Implementation of a new feature across the thousands of available printers today and new printers as they are introduced can be an endless task. Custom print processors, spoolers and other print system components as well as stand-alone components and applications can be more portable and less device-specific.

Some components of embodiments of the present invention may be implemented as printer firmware. A firmware implementation typically requires a more expensive printer often containing a microprocessor and storage or memory. Printers with firmware support of custom features alleviate the need for driver support and storage on a host computer.

Many computing device platforms and printing systems are available today and embodiments of the present invention may be implemented with many of these systems, however, due to the prevalence of the Microsoft Windows® operating system family, embodiments used in conjunction with Windows® systems will be used to illustrate its functions. Accordingly, details of Microsoft Windows® printing processes will be explained.

Microsoft Windows® operating systems typically employ two file types in the printing process. These file types are Enhanced Metafile (EMF) and raw format (raw) files.

Raw format files are device dependent files, which are destined and formatted for a specific device. An example of a raw file is an encapsulated Postscript file that is formatted to be interpreted by a Postscript printer. EMF files are device independent files that contain graphic device interface (GDI) function calls that reproduce an application's graphic elements on a printer. EMF files are used to quickly record a printed document and return system control to a user. After control is returned to the user, the function calls stored in the EMF file may be accessed and sent to the printer in the background.

Files may be recorded for later play back by using a spool file that is written and later despooled to a printing device. Spool files may be used for EMF and raw files. However, a print job may also be written directly to a printing device without using a spool file. Some typical printing process scenarios using raw spool files and EMF spool files are described below to introduce the components, elements and relationships of these processes and how they relate to embodiments of the present invention. These scenarios are derived from information contained in the Microsoft Windows 95® Driver Development Kit (DDK) documentation, the Microsoft Windows 2000® DDK documentation and the Microsoft Windows NT® DDK documentation.

A typical printing process scenario using a raw spool file may be described in reference to FIG. 1 wherein an application 10 initiates a print request 1 by calling a graphic device interface (GDI) 12. Application 10 may be a word processor, spreadsheet, browser, database program or some other program that runs on the underlying operating system. Typically, application 10 will create a device context (DC) and draw an object (i.e., a circle, a line, etc.) to the DC. The application 10 will then call the GDI with a print request directed to a particular printer 16 (FIG. 2) using that DC.

The GDI 12 will call the printer driver 14 associated with the particular printer 16 and request 2 instructions on how to render the object on that particular printer 16. The printer driver 14 will return 3 the instructions on how to render the object on the printer 16. In Windows 95®, used in this printing process example, the printer driver 14 is written in 16-bit code and communicates with a 16-bit GDI 12. This GDI will then pass the print request to a 32-bit GDI (GDI32) 18 to handle the 32-bit Windows 95® spooler process. GDI32 makes an interprocess call 5 to the spooler process 20.

Spooler process 20 calls 6 the router 22 to route the print job to printer 16. In this example, illustrated in FIGS. 1-2, the router 22 sends the print job to a local print provider 24. In other scenarios, the router 22 may send print jobs to a network printer through a network print provider (not shown). When the default Windows 95® spooler is used, network print jobs are spooled and despooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, spooling and despooling are handled by the print spooler on the print server. This RPC method can be used in conjunction with Windows 95® spoolers also. Print jobs to locally connected printers or locally queued to (e.g., LPR) to network printers are handled similarly to Windows 95, 98 local print jobs.

In this local printing scenario, the router 22 calls the local print provider 24 with the print job. Local print provider 24 writes or "spools" 8 a raw spool file 26 to disk for later access. This is done to avoid waiting for the printer to complete the job before control is returned to the application. These steps from initiating the print request 1 to writing to spool file 26 may be repeated many times. Data may be appended to spool file 26 until an application signals that the print job is complete. This may be signalled with an EndDoc function. Local print provider 24 also starts 9 a background thread 28 that will determine the best time to start playing back or "despooling" the spool file 26 to the printer 16.

Figure 2:
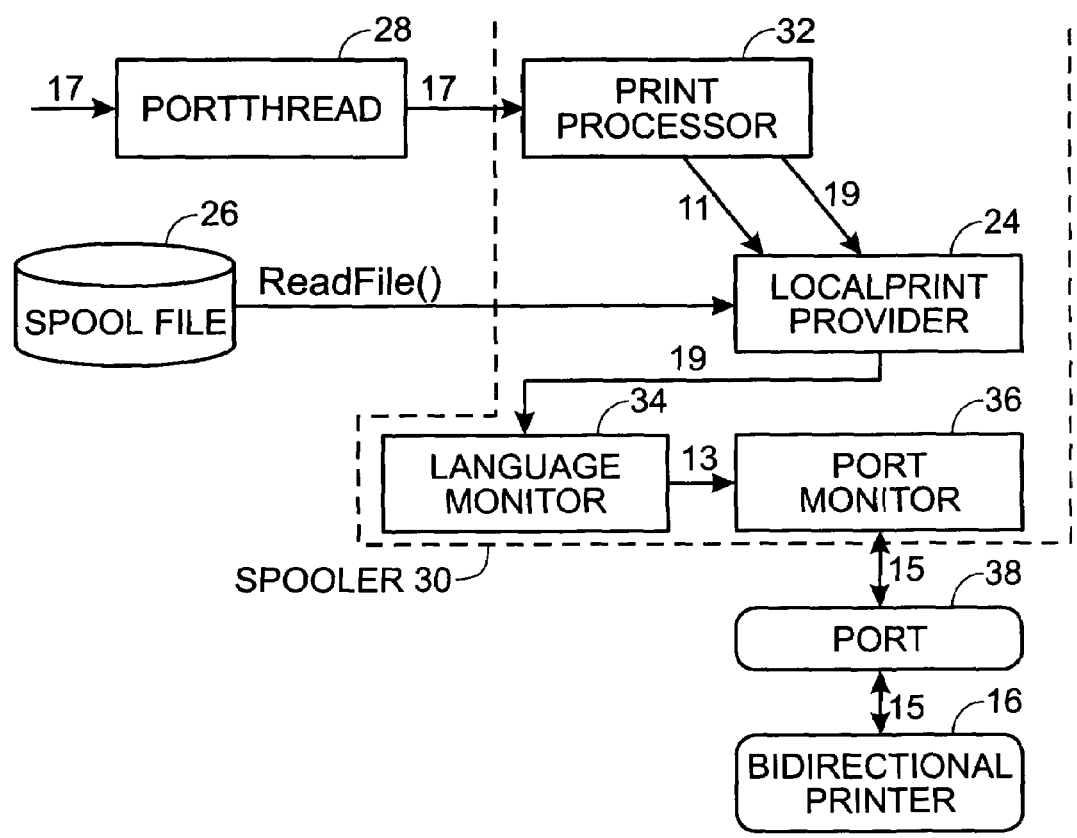
FIG. 2 is a diagram depicting a continuation of the typical prior art printing process using a raw spool file shown in FIG. 1.

In reference to FIG. 2, Thread 28 monitors spooler subsystem resources to determine a good time to playback spool file 26. When thread 28 determines that playback should commence, a StartDoc function call 17 is sent to print processor 32 to start a new print processor thread 11. Print processor thread 11 invokes the local print provider 24 with a ReadPrinter function call to read part of the spool file 26. A print processor thread 19 also uses the local print provider 24 to invoke the language monitor 34 with a WritePrinter function call to send data through the physical port 38 connected with the bidirectional printer 16 specified previously.

For raw spool files, the default print processor 32 simply passes data through without changing or interpreting any of the information. A language monitor 34 is used in this example because the destination printer 16 is a bidirectional printer. When non-bidirectional printers are used a port monitor 36 would be invoked instead of the language monitor 34. A language monitor 34 and port monitor 36 may be separate components or may be integrated into one monitor.

Language monitor 34 calls 13 a port monitor 36 to send print job data to the printer 16. The port monitor 36 then sends 15 the raw data through the physical port 38 to the printer 16. This process of reading from a spool file 26 and forwarding data to the printer 16 may be repeated several times to complete a print job. This is typically repeated until an end-of-file is reached or the job is cancelled. The playback thread 19 is terminated at that point. The combination of spooler process, router, local print provider, print processor, language monitor and port monitor may be referred to collectively as a "spooler" 30.

Figure 3:
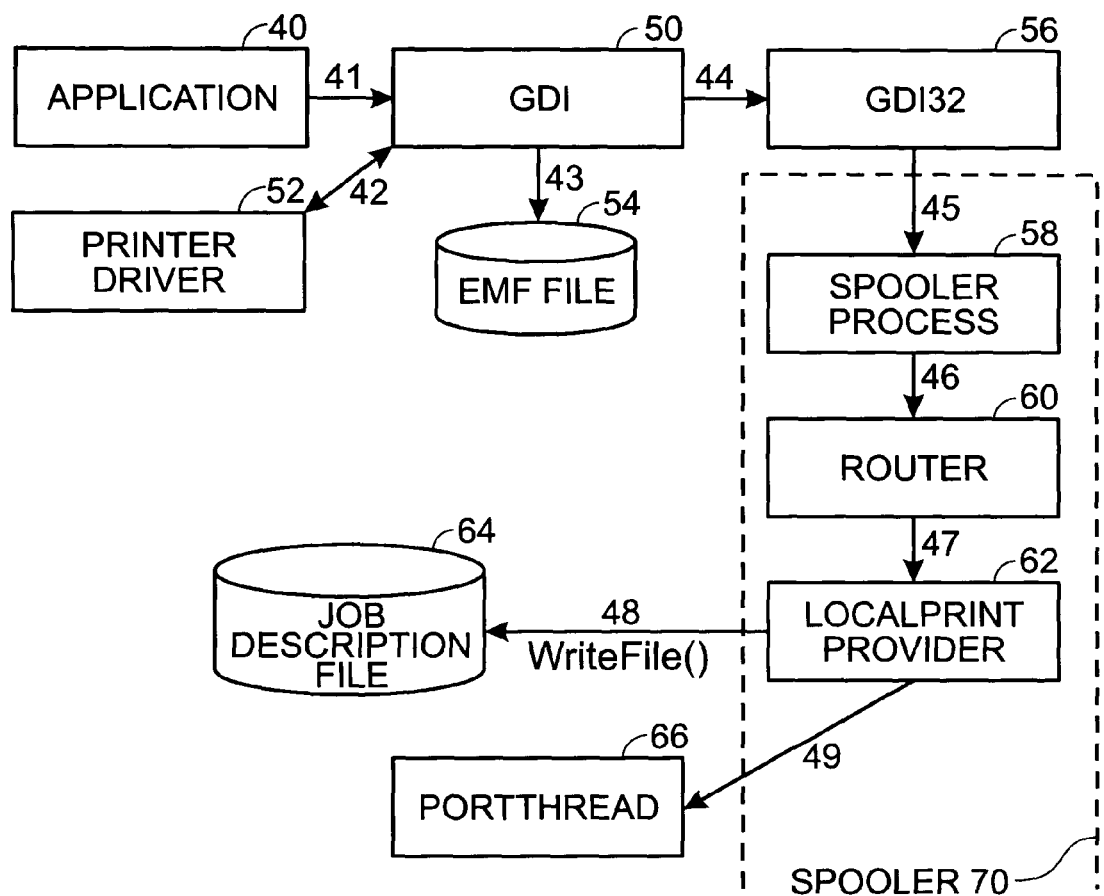
FIG. 3 is a diagram depicting a prior art printing process wherein EMF files are spooled.
Figure 4:
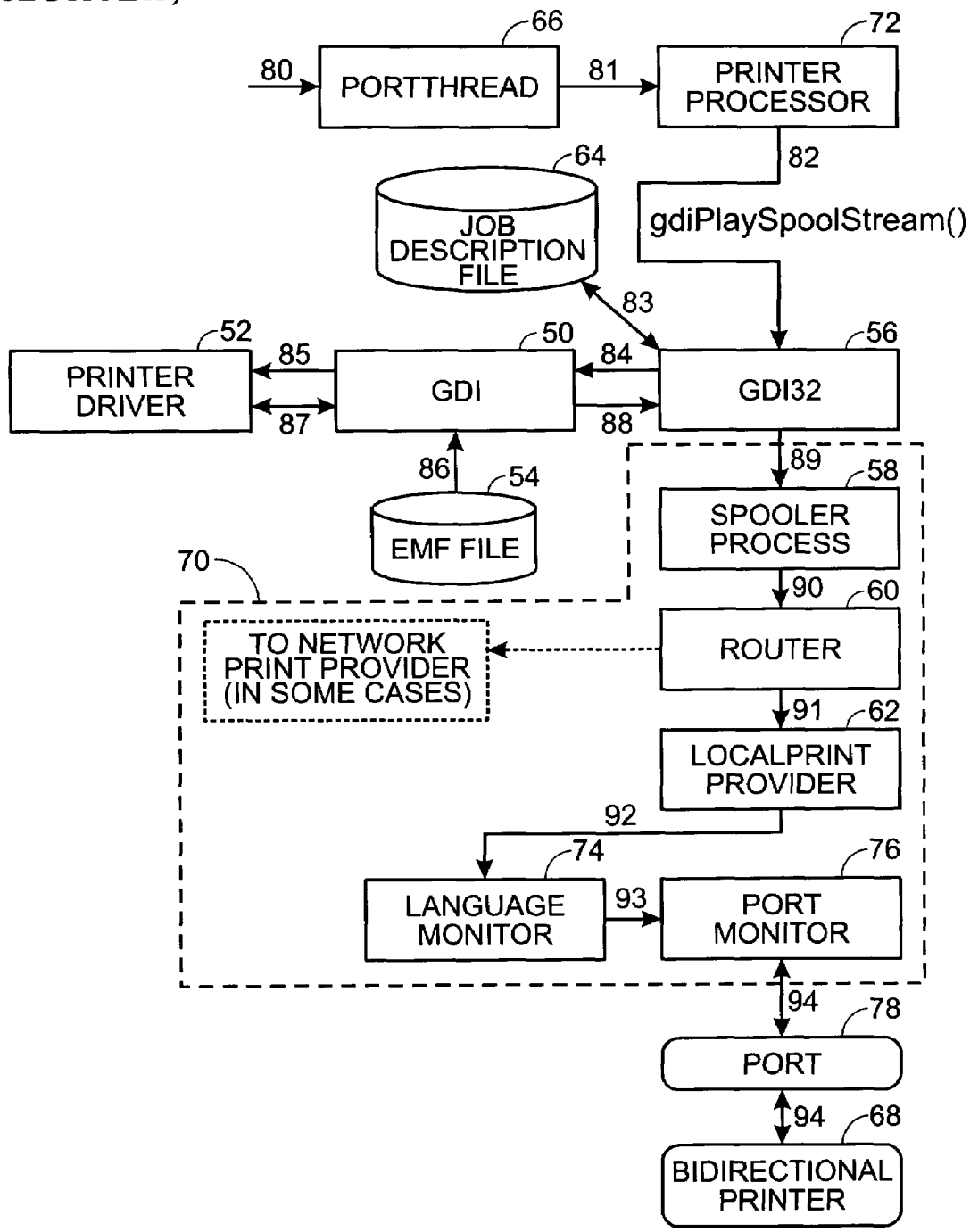
FIG. 4 is a diagram depicting a prior art printing process wherein EMF files are despooled.

When Windows Enhanced Metafile (EMF) format files are used in the printing process of Windows 9.x systems, process components interact differently than with raw files. An example printing process, shown in FIGS. 3 and 4 illustrates the printing process using EMF files.

This process typically commences when an application 40 creates a printer DC and draws an object to the DC (not shown). The application 40 then calls 41 GDI 50 with an EMF spooling request for a designated printer 68. GDI 50 queries 42 the printer driver 52 associated with the designated printer 68 to determine whether the driver 52 supports EMF spooling. If the driver 52 supports EMF spooling, GDI 50 changes the printer DC to an EMF DC and writes 43 the instructions for rendering the object to the EMF DC 54 (creates EMF files). GDI 50 then passes 44 the print request to the 32-bit GDI (GDI32) 56 because, in this example the Windows 95® spooler process is 32-bit code. GDI 32 subsequently makes an interprocess call 45 to the spooler subsystem 70 with a description of the print job.

The spooler process 58 (SPOOL32.EXE), in the spooler system 70, calls the router 60 to pass the print job description to the print provider 62 that can reach the designated printer 68. In this example, a local print provider 62 is used, but a network print provider may also be used. When the default Windows 95® spooler is used, network print jobs are spooled and despooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, spooling and despooling are handled by the print spooler on the print server. This RPC method can be used in conjunction with Windows 95® spoolers also.

When the router 60 has called the print provider 62, the local print provider 62 creates 48 a job description file 64 and adds 48 a record to the job description file 64 each time it is called for the job until all the EMF page files have been spooled and each EMF file name and location is recorded in the job description file 64. When information about the last EMF file in the print job has been recorded, the local print provider 62 will call the spooler process 58 with an EndDoc function call. This signals the spooler process 58 that the complete job is spooled and ready for despooling. For multipage jobs, these steps from initial spooling request 41 to job description file recording 48 are repeated for each page of a job.

When EMF file spooling is complete, the spooler process 58 sets a ReadyToPrint attribute on the print job and initiates an event 49 that signals to the port thread 66 that a job is available for printing. Port thread 66 responds to this event by determining the best time to start the despooling process and, at that time, loads 81 the print processor 72, as shown in FIG. 4. The print processor 72 will determine that the file format is EMF and call GDI32 56 with a Windows 95® function call 82.

GDI32 then invokes a gdiPlaySpoolStream function to read 83 from the job description file 64 which provides a fully qualified path to an EMF spool file 54. Through the job description file 64 which comprises a list of path names to EMF files, GDI32 knows about all the pages in the print job. The GDI32 gdiPlaySpoolStream function also calls GDI 50, using a thunk built into GDI32, with the path to the EMF spool file to render the page. GDI 50 only knows about one page in the print job at a time.

GDI 50 calls the printer driver 52 associated with the designated printer 68 chosen in application 40 and obtains a DC for the printer 68. GDI 50 then reads page-rendering instructions from the spooled EMF file 54 and passes 85 them one at a time to the printer driver 52 which uses as many instructions as are necessary to render the first part of the page. When the 16-bit printer driver 52 renders a part of the page, it passes 87 the printer-specific raw page data back to the GDI 50 which, in turn, passes 88 the raw data to GDI32 56. GDI32 56 then passes 89 the raw data to the spooler process 58 which then follows the same procedures it would for a raw format files as explained above.

Spooler process 58 calls 90 the router 60 to route the print job to printer 68. In this example, illustrated in FIGS. 3 and 4, the router 60 sends the print job to a local print provider 62. In other scenarios, the router 60 may send print jobs to a network printer through a network print provider (not shown). In this local printing scenario, the router 60 calls the local print provider 62 with the print job. Local print provider 62 invokes the language monitor 74 with a WritePrinter function call to send data through the physical port 78 connected with the bidirectional printer 68 specified previously.

A language monitor 74 is used in this example because the destination printer 68 is a bidirectional printer. When non-bidirectional printers are used a port monitor 76 would be invoked instead of the language monitor 74. A language monitor 74 and port monitor 76 may be separate components or may be integrated into one monitor. Language monitor 74 calls 93 a port monitor 76 to send print job data to the printer 68. The port monitor 76 then sends 94 the raw data through the physical port 78 to the printer 68.

Parts of EMF pages are processed in this manner and printed until an entire page is printed. GDI32 56 then gets the path to the EMF spool file for the next page and calls GDI 50 to use the instructions in that EMF file to render the next page of the print job. The print job is finished when all the paths to EMF spool files are used up.

Figure 5:
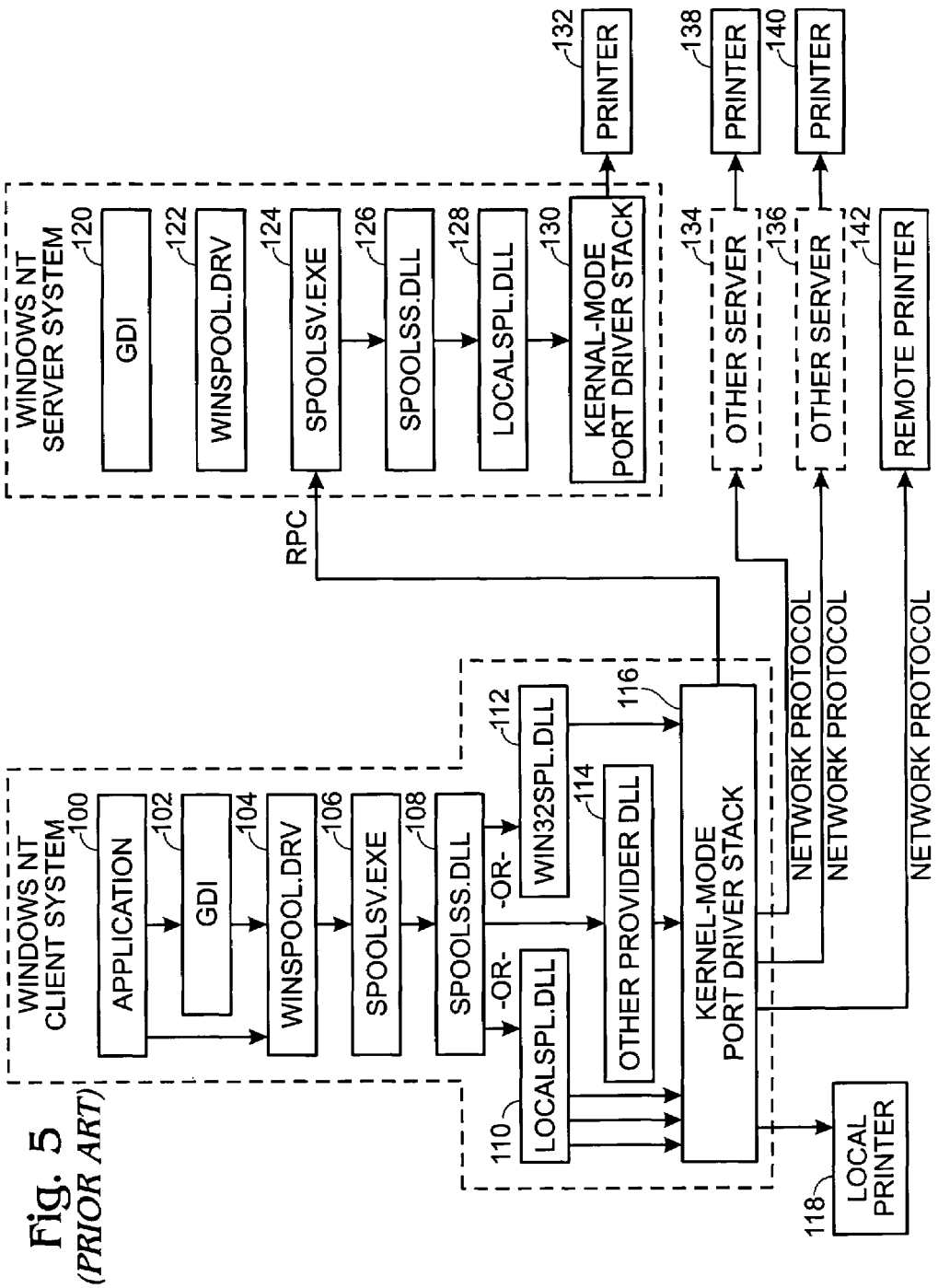
FIG. 5 is a diagram depicting a prior art printing process used in a Microsoft Windows NT/2000 operating system.

Other versions of the Microsoft Windows operating systems, such as Windows NT and 2000 may use different printing processes as described with reference to FIG. 5. These processes may be used to print data to local, network and remote printers either directly or through a network print server. EMF data may also be processed differently. For example, in Windows NT and 2000, the entire EMF data for all pages is passed to GdiPlayEMF( ) in one pass, rather than one page at a time. If the EMF data is to be queued on a print server, the EMF data is passed directly to the print server without rendering on the client. A mirror copy of the driver on the server renders the EMF data instead.

Typically, a user will employ an application 100 to create a print job by calling GDI 102 functions. The GDI 102 and/or application 100 will then call Winspool.drv 104, which is a client interface into the spooler. This client interface, Winspool.drv 104, exports the functions that make up the spooler's Win32® API and provides RPC stubs for accessing the server. The print job is then forwarded to the spooler's API server, Spoolsv.exe 106 which can be implemented as a Windows 2000 service that is started when the operating system is started. This API server module exports an RPC interface to the server side of the spooler's Win32® API. This module implements some API functions, but most function calls are passed to a print provider by means of the router, spoolss.dll 108.

The router 108 determines which print provider to call, based on a printer name or handle supplied with each function call, and passes the function call to the correct provider 110, 112 or 114. If the selected printer is managed by the client system, the print job is handled by the local print provider, localspl.dll 110. Printers managed by the local print provider 110 do not have to be physically local to the client, they may also be directly connected to network cards without using a server. When these printers are used, the print job is passed to the kernel-mode port driver stack 116 and on to the printer 118.

When printers located on a Windows NT/Windows 2000 server are selected, the router 108 directs the print job to the network print provider, Win32spl.dll 112. This network provider uses RPC to redirect calls from the client's router to the network server's spoolsv.exe process 124 which forwards the print job to the network server's router 126. Because the network printer is local to the print server system, the network server router 126 routes the job to the server's local print provider 128. The job is then directed to the server's kernel-mode port driver stack 130 and out to the selected network printer 132.

Remote printers may also be used with these systems. When a remote printer is selected, the client router 108 may direct the print job to the local print provider 110 which will forward the job to the kernel-mode port driver stack 116 and on to the remote printer 142 using a network protocol. When the local print provider 110 accesses a remote printer 142, the provider 110 uses a port monitor that can use network protocols recognized by the remote printer or its server.

Printers managed by non-Windows NT/2000 servers (e.g., Novell servers) may also be accessed through this print system. This may be achieved by using a local print provider 110 which directs the print job to the kernel-mode port driver stack 116 and on to the printer's server 136 using a type of network protocol. The server 136 then directs the job to the destination printer 140. This may also be achieved using a customized print provider 114 which sends the job to the kernel-mode port driver stack 116 which uses a network protocol to send the job on the printer's server 134 which then directs the job to the destination printer 138.

Figure 6:
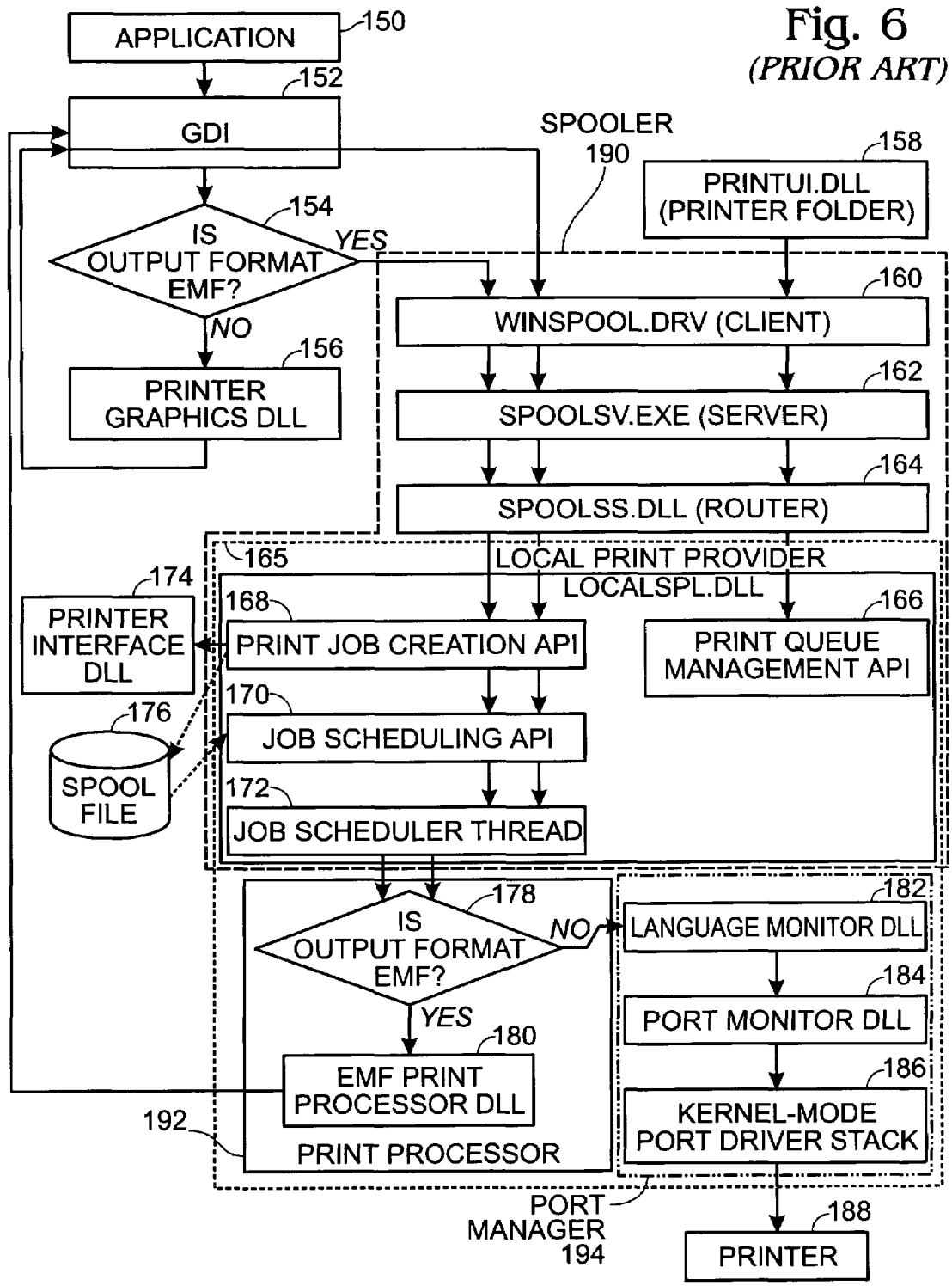
FIG. 6 is a diagram depicting the prior art printing process used in a Microsoft Windows NT/2000 operating system shown in FIG. 5.

An example of these printing processes may be explained with reference to FIG. 6 which illustrates a Windows 2000 print process. In this process, an application 150 is used to create a print job with the Graphics Device Interface (GDI) 152. When the print job's initial output file is in raw format 154, the printer driver's printer graphics DLL 156 works in conjunction with the GDI 152 to create a print job that is sent to the client interface 160 of the spooler. Client interface 160 sends the job to the API server 162 which forwards the job to the router 164. In this example, the router 164, sends the job to the local print provider 165 as it is a local print job.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in a raw format already, the job is sent to the language monitor DLL 182 and on to the port monitor 184 which sends the job to the kernel-mode port driver stack 186. Port driver stack 186 sends the job to the selected printer 188 for final printing.

When an application 150 creates a print job with GDI 152 in EMF format, the job is sent 154 to a client spooler interface 160. Client interface 160 sends the job to the API server 162 which forwards the job to the router 164. Again, in this example, the router 164, sends the job to the local print provider 165 because the print job is local.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in EMF format, the job is sent to the print processor DLL 180 which directs the job back to GDI 152 for conversion to raw format with the help of printer interface DLL 174. The converted job is then sent back through the spooler client interface 160, API server 162 and router 164 to the print provider 165. In the local print provider, the job is processed by the print job creation API 168, job scheduling API 170 and job scheduler thread 172. Because the job is now in raw format, the job is sent to the language monitor DLL 182 and on to the port monitor DLL 184 and kernel-mode port driver stack 186 before arriving at the destination printer 188.

Some embodiments of the present invention may be explained with reference to FIG. 7, which is a block diagram of an embodiment of a system 100 for context-based adaptive image processing. The system 100 includes a computer system 110. The computer system 110 may comprise any type of computing device, including a personal computer, workstation, personal digital assistant, etc. The computer system 110 typically includes an operating system (not shown). The computer system 110 may run one or more applications 112. Examples of applications 112 include word processors, spreadsheets, communication software, presentation software, etc. Typically, a user of the computer system 110 may utilize an application 112 to generate one or more documents 114. In some embodiments, the computer system 110 may further comprise computer network components including other computing devices, servers, routers, hubs, switches and output devices such as displays, printers, plotters, CD writers, tape drives and other devices.

Figure 7:
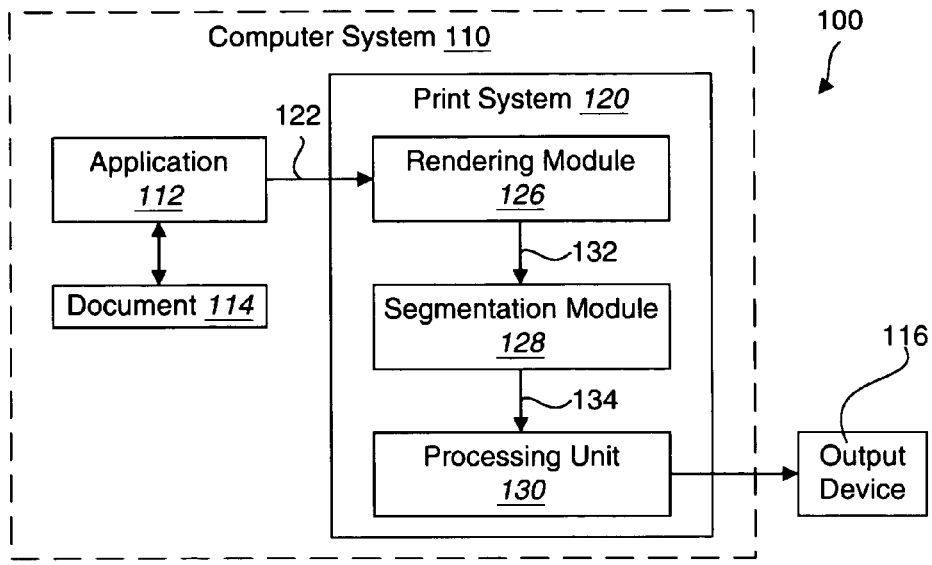
FIG. 7 is a block diagram of an embodiment of a system for context-based adaptive image processing.

The simplified computer system 110 of the exemplary embodiment shown in FIG. 7 may be connected to an output device 116 such as a printer. The output device 116 may be any type of output device that is capable of forming an image and that can be used in combination with the computer system 110. Embodiments of the present invention function well with many commercially available printers. The printer 116 may be used to print one or more documents 114 created by the application 112.

System 100 further comprises an output system or print system 120 for converting an application's output to a format compatible with an output device. An output system or print system 120 may comprise a printer driver, print processor, spooler, print provider as well as other print system components as described above in relation to Microsoft operating systems. These print system components are software that enable the application 112 to communicate with the printer 116. When the application 112 needs to print a document, it sends print data 122 to the print system 120. Print data 122 is data describing the document 114 to be printed. Typically, the print data 122 is a series of commands (e.g., draw a circle, draw a line of text in a particular font, etc.). The printer system 120 accepts the print data 122 from the application 112 and then creates printer ready data 124. The printer ready data 124 is print data 122 translated into a format that the printer 116 can understand. The format of the printer ready data 124 may depend on the capabilities of the printer 116. Typically, the printer ready data 124 is pixel data, i.e., data that may be used to print pixels on a piece of paper.

Embodiments of the print system 120 shown in FIG. 7 comprise three modules that facilitate the conversion of print data 122 into printer ready data 124: a rendering module 126, a segmentation module 128, and a processing unit 130. The rendering module 126 receives the print data 122 from the application 112 and renders the print data to create pixel data 132 representing the document 114 to be printed. Rendering module 126 may comprise operating system components and elements or may be a part of print system components. In some embodiments, rendering modules 126 that function in conjunction with Microsoft Windows operating systems may create a Windows Device Context as part of pixel data. As stated previously, pixel data 132 is data that may be used to print pixels on a piece of paper or other material. Typically, the pixel data 132 includes a plurality of pixel values designating the color and/or intensity of an image element (e.g., RGB values, CMYK values, etc.).

In some embodiments, the document 114 and its related image or pixel data may include one or more regions of interest (ROI). An ROI can be any part of the document 114 that can benefit from individualized processing. An ROI may take the form of a page, a band (i.e., a rectangular section within a page), a horizontal raster, a specific shape within an image, an area occupied by a specific graphical type or context, a single pixel, or the like.

In some embodiments of the present invention, segmentation module 128 receives the pixel data 132 from the rendering module 126 and creates partitioned pixel data 134. In some of these embodiments, a segmentation module 128 partitions the pixel data 132 into a plurality of data structures. The segmentation module 128 also uses a segmentation algorithm to determine context data, i.e., particular characteristics about the pixel data 132. A segmentation module 128 may determine this context data without reference to the print data 122. Many different types of context data may be determined. For example, the segmentation module 128 may determine whether the pixel data 132 corresponding to a particular context or region includes black-and-white pixels and/or color pixels. A segmentation module 128 may also determine whether the pixel data 132 corresponding to a particular context or ROI includes image pixels and/or non-image pixels. The segmentation module 128 may also determine whether the pixel data 132 corresponding to a particular context or ROI includes text whether the text is found in a bitmap region or a typical text format region. Of course, the examples provided herein are not to be construed as limiting; the segmentation module 128 may be used to determine any characteristic that may affect how the pixel data 132 may be processed. The implementation details associated with the segmentation module 128 are known to those skilled in the art.

The partitioned pixel data 134 generated by the segmentation module 128 is then sent to the processing unit 130. The processing unit 130 uses the context data generated by the segmentation module 128 to process the data structures corresponding to the context types and/or ROIs within the document 114.

Figure 8:
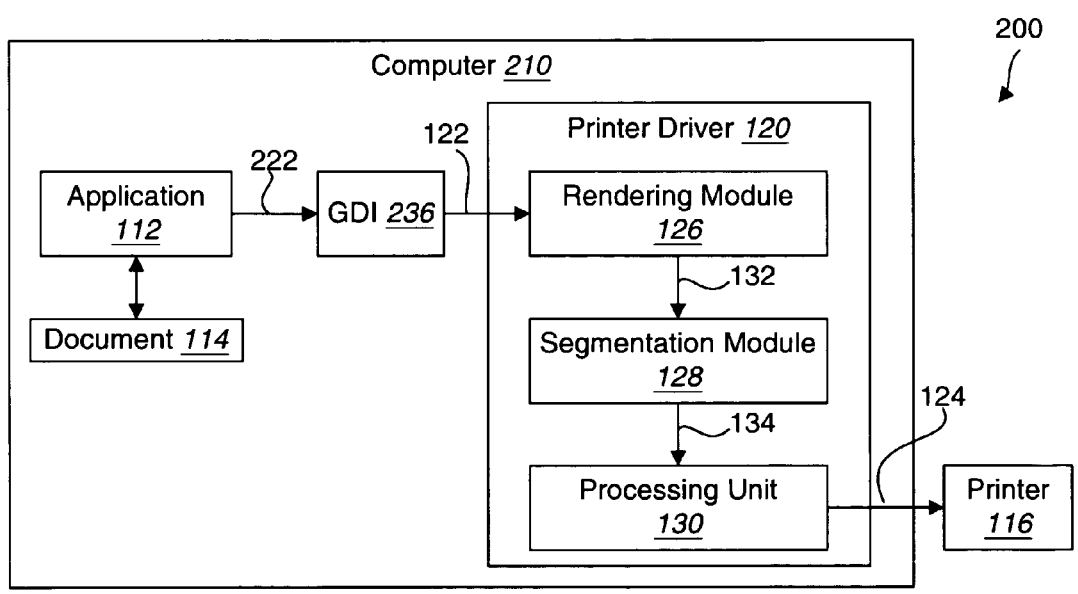
FIG. 8 is a block diagram illustrating a second embodiment of a system for context-based adaptive image processing.

FIG. 8 is a block diagram illustrating some embodiments of a system 200 for context-based adaptive image processing. This particular system 200 includes a graphical device interface 236 (GDI) between the application 112 and the printer driver 120 as is typical in many Microsoft operating systems as explained above. The GDI 236 allows the application 112 to communicate with the printer driver 120 without knowing specific information about the printer driver 120. This allows the application 112 to create generic print data 222. For example, to begin printing a document 114 the application 112 may send a series of commands that can be understood by the GDI 236, but not necessarily by the printer driver 120. The GDI 236 may then convert this generic print data 222 into print data 122 that the printer driver 120 can understand. It should be understood that rendering module 126, segmentation module 128 and processing unit 130 may reside within a printer driver 120, within other print system components or may communicate with print system components to accomplish their various tasks.

In some embodiments of the present invention, the document 114 may be any document 114 generated by the application 112, such as a word processing document, a spreadsheet document, a web page displayed by a web browser, an image generated by photo manipulation software, etc.

Figure 9:
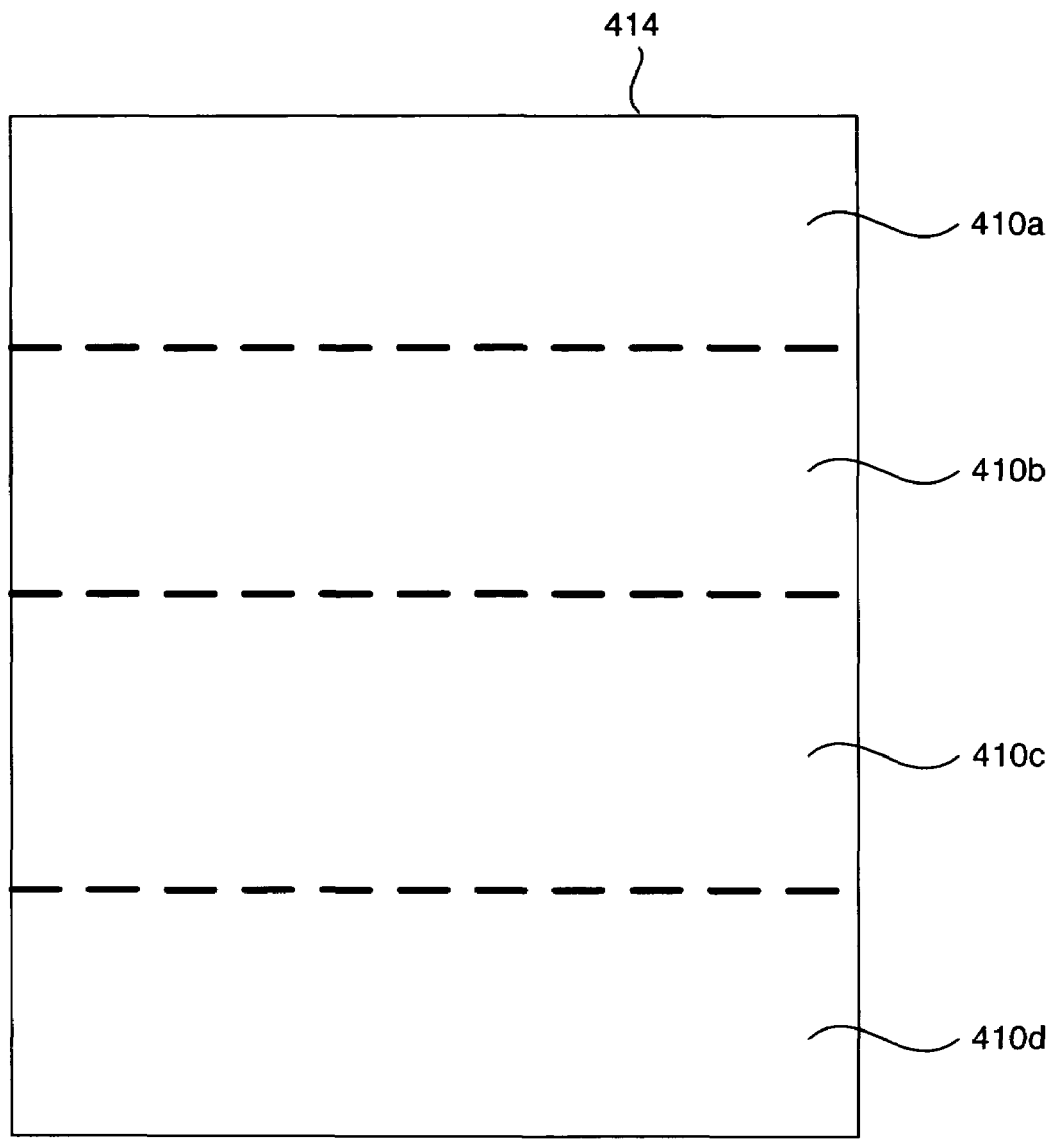
FIG. 9 is a diagram illustrating how a document may be partitioned into regions of interest (ROIs)

FIG. 9 is a diagram illustrating how a document 414 may be partitioned into ROIs 410. In the embodiment illustrated in FIG. 9, each ROI 410 is a rectangular section within a page of the document 414, which is also referred to as a band of the document 414. Four ROIs 410a-d are shown in FIG. 9.

Figure 10:
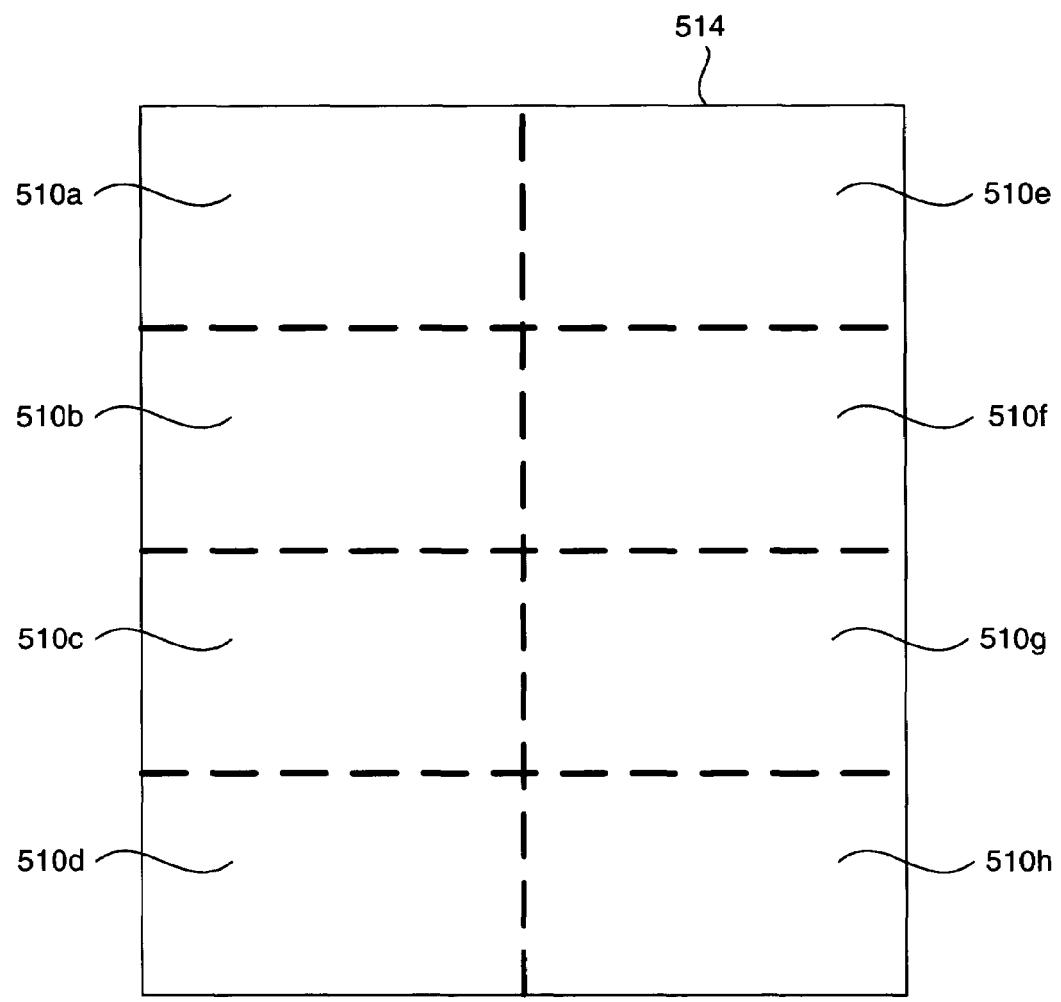
FIG. 10 is a diagram illustrating an alternative way in which a document may be partitioned into ROIs.

FIG. 10 is a diagram illustrating an alternative way in which a document 514 may be partitioned into ROIs 510. In the embodiment illustrated in FIG. 10, each ROI 510 is a portion of a band of the document 514. Eight ROIs 510a-h are shown in FIG. 10. Of course, as stated previously, an ROI 510 may be any part of the document 514 that would benefit from individualized processing, including multiple pages, a single page, a horizontal raster, a context, a pixel, etc.

Figure 11:
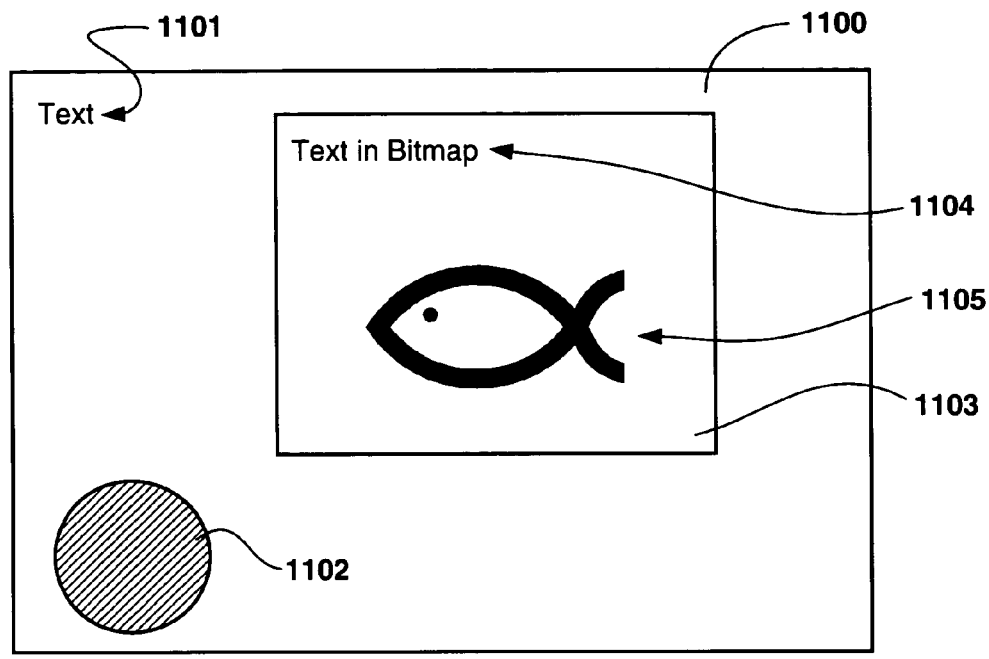
FIG. 11 is a block diagram illustrating an embodiment of a document that may be printed by the printer.

FIG. 11 shows another exemplary document 1100 comprising typical text 1101, a solid-colored shape 1102 and a bitmap 1103. Bitmap 1103 further comprises a bitmap text element 1104 and a bitmap image element 1105. Documents may also comprise solid-shape bitmap elements and vector images comprising vector graphics and vector text as well as other elements.

Figure 12:
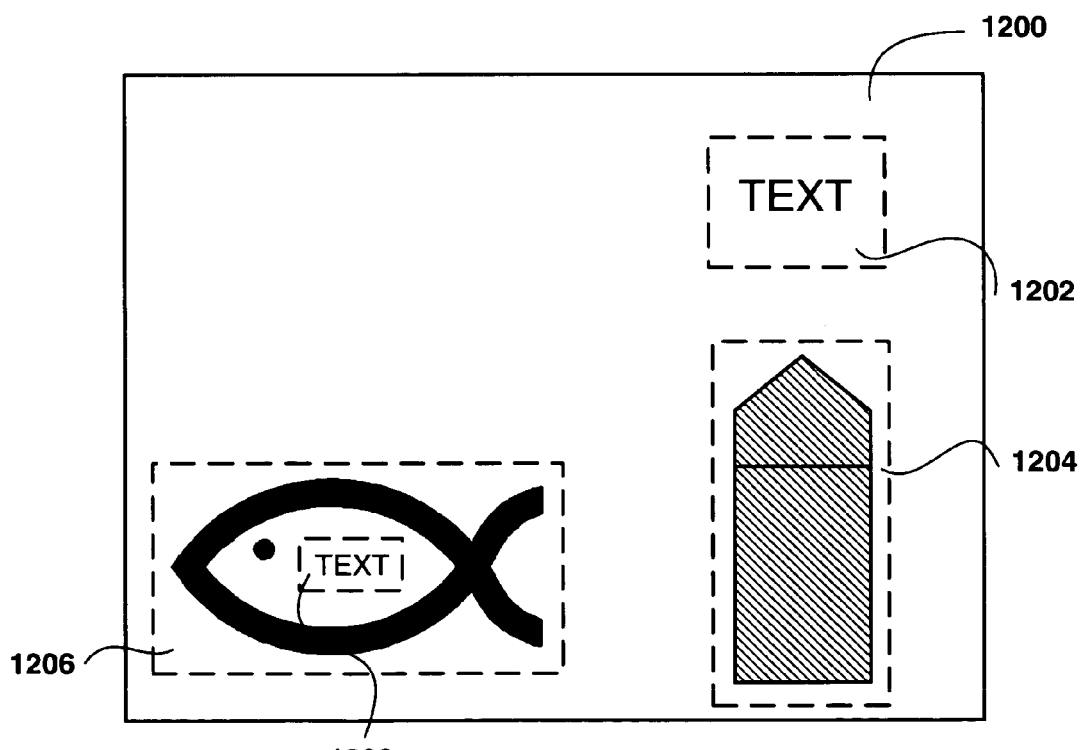
FIG. 12 is a diagram illustrating an alternative method for partitioning ROIs.

Other embodiments of the present invention, as illustrated in FIG. 12, may comprise ROIs that are identified by context type. A document 1200 may be divided into ROIs through segmentation, edge detection and other methods in which a context is identified and contiguous areas of that context are delineated. In a document 1200, a first ROI 1202 may comprise a contiguous region of text with a defined boundary. This document 1200 may also comprise a second ROI 1204 comprising solid-colored geometric shapes. A document 1200 may further comprise a third ROI 1206 comprising a bitmap image. Some ROIs such as third ROI 1206 may wrap around other ROIs within their exterior boundaries. In the case of third ROI 1206, which comprises a bitmap image, a smaller fourth ROI 1208 comprising bitmap text may be "carved out of" third ROI 1206 using known methods. Many other ROI configurations may also be used.

Figure 13:
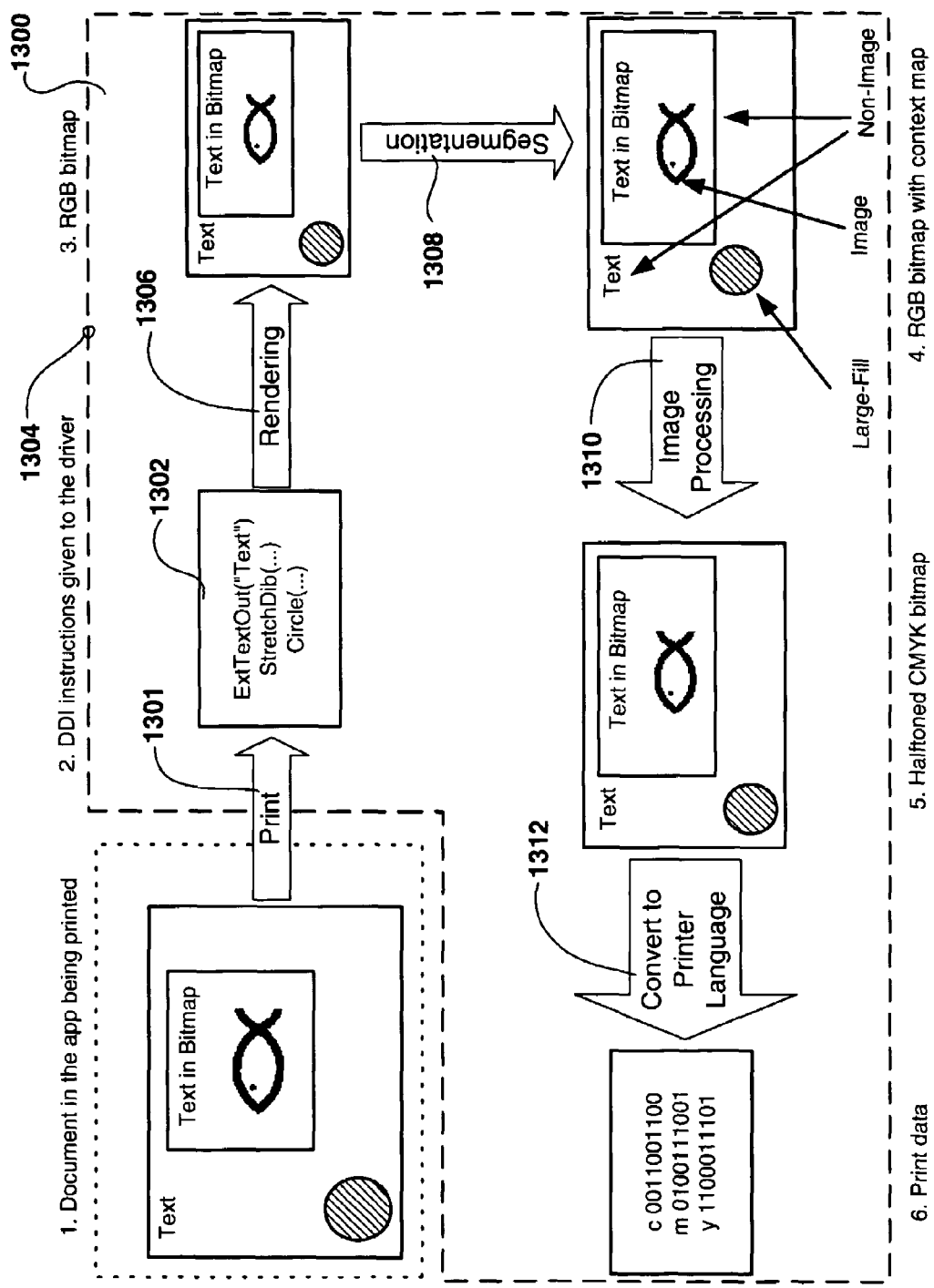
FIG. 13 is a diagram illustrating printing methods of an embodiment of the present invention.

Some embodiments of the present invention may be described with reference to FIG. 13. In these embodiments, a document 1100 is created using an application. This document 1300 may comprise typical text 1301, a solid-colored shape 1302 and a bitmap 1303 as well as other elements. When a user desires to print the document 1300, the proper selection is made in the application and the application data is sent 1301 to the print system. In some embodiments, the print data 1302 is sent to a print driver or other print system component 1304 comprising a rendering module for rendering the print data 1302 into a bitmap. The mapped data is then processed by a segmentation module to determine the context of each portion of the document. Elements of the document that correspond to a particular context may be associated with that context in a context map or some other relational method. Each pixel of the document may be associated with a context in the context map. For example, in document 1300 the pixels within the typical text 1301, the solid shape 1302, the bitmap text 1304 and the bitmap image 1305 may be mapped to their particular contexts. Each of these contexts may correspond to an individual processing algorithm or method. Multiple contexts may also correspond to a single processing method. For example, the typical text 1301 and the bitmap text 1304 may correspond to the same processing method. These similar document elements may be mapped to the same context or multiple contexts, which may be correlated with a single processing method.

Each pixel or group of pixels may be mapped or otherwise correlated to a specific context. A context map, database or other format may be used for this correlation. Each context or group of contexts is associated with a specific rendering or processing algorithm or method.

After the context map or other correlation method is complete, the print data may be sent 1310 to an image processing module. The image processing unit will process print data that has been correlated to a specific processing method according to the appropriate method. Various processing methods will be used for a typical document. Once this stage of image processing is complete, a final bitmap is converted 1312 to printer language and transmitted to a printer.

In some embodiments of the present invention, ROIs may be used to facilitate image processing. In some of these embodiments, a context category may be either homogeneous or heterogeneous. If the context category is homogeneous, this means that all of the pixel data within an ROI is correlated to the same context. In contrast, if the context category is homogeneous, this means that not all of the pixel data within the ROI data is correlated to the same context. For example, the context category may be homogeneous if the pixel data within the ROI includes only color bitmap image pixel values. Similarly, the context category may be homogeneous if the pixel data within the ROI includes only black-and-white text pixel values. In contrast, the context category may be heterogeneous if the pixel data within the ROI includes both color pixel values and black-and-white pixel values.

If the context category is homogeneous, the ROI data may include a context type. In some embodiments, the context type may be one of three values: color, black-and-white, or blank. In such an embodiment, if the context type is color, this may indicate that the pixel data within that ROI includes only color pixel values (i.e., pixel values that correspond to color pixels). If the context type is black-and-white, this may indicate that the pixel data includes only black-and-white pixel values. If the context type is blank, this may indicate that the pixel data does not include any pixel values that are not "blank."

In other embodiments, the context type may be one of five values: color image, color non-image, black-and-white image, black-and-white non-image, or blank. As used herein, an image refers to a bitmapped reproduction of a scene such as a digital photograph, whereas a non-image refers to computer-generated graphics (e.g., text, line art, solid objects, etc.). In such an embodiment, if the context type is color image, this means that the pixel data only includes pixel values corresponding to a color image. If the context type is color non-image, this means that the pixel data only includes pixel values corresponding to a color non-image. If the context type is black-and-white image, this means that the pixel data only includes pixel values corresponding to a black-and-white image. If the context type is black-and-white non-image, this means that the pixel data only includes pixel values corresponding to a black-and-white non-image. If the context type is blank, this means that the pixel data does not include any pixel values.

Of course, the context types listed above are exemplary only. Those skilled in the art will recognize numerous additional context types that may be used with embodiments disclosed herein.

Figure 14:
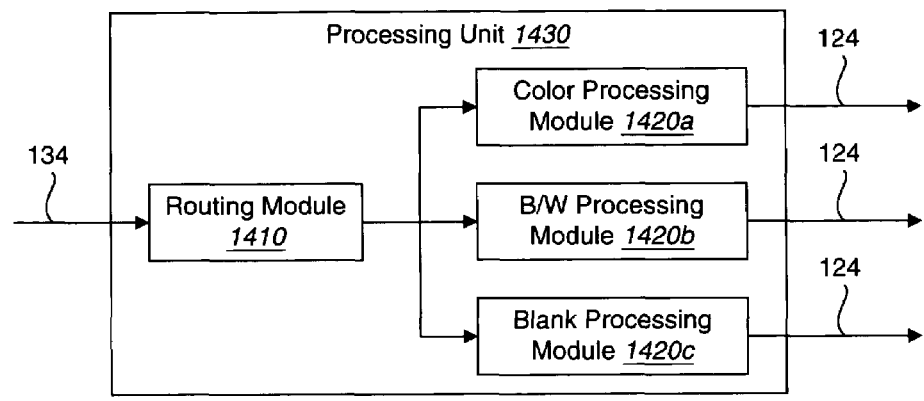
FIG. 14 is a block diagram illustrating an embodiment of the processing unit.

FIG. 14 is a block diagram illustrating an embodiment of a processing unit 1430, which may be comprised in a print system component such as a driver, print processor, spooler or other component. Processing unit 1430 may also reside outside typical print system components, but be invoked or executed by a print stream component or by a user. The processing unit 1430 may include a routing module 1410. The routing module 1410 receives the context-correlated pixel data from the segmentation module and, based on the context data, decides where to send the context-correlated pixel data.

The processing unit 1430 may include a plurality of processing modules 1420. In the embodiment shown in FIG. 14, three processing modules 1420 are included: a color processing module 1420a, a black-and-white processing module 1420b, and a blank processing module 1420c. The color processing module 1420a is capable of processing pixel data 132 that includes color pixel values. The black-and-white processing module 1420b is capable of processing pixel data 132 that includes black-and-white pixel values. The blank processing module 1020c is capable of processing pixel data that includes only blank pixel values. Those skilled in the art will recognize many different ways to implement the color processing module 1420a, black-and-white processing module 1420b, and blank processing module 1420c in light of the teachings contained herein.

As stated previously, the context-correlated pixel data may include one or more ROI data structures, and each ROI data structure may include pixel data corresponding to a ROI. The routing module 1410 may decide how to process the pixel data within each ROI based on the context data within each ROI. For example, if the routing module 1410 determines that the pixel data within a ROI includes only color pixel values (by, e.g., examining the context category and context type within the ROI), the routing module 1410 may send the pixel data to the color processing module 1420a. If the routing module 1410 determines that the pixel data within an ROI includes only black-and-white pixel values, the routing module 1410 may send the pixel data within the ROI to the black-and-white processing module 1420b. If the routing module 1410 determines that the pixel data within an ROI includes only blank pixel values, the routing module 1410 may send the ROI data to the blank processing module 1420c.

If the routing module 1410 determines that the pixel data 1232 within an image or an ROI includes pixels that are correlated to a plurality of contexts, the routing module 1410 may send a first portion of the pixel data, which is correlated to a first context to the processing module associated with that context. The routing module 1410 may also send a second portion of the pixel data, which is correlated to a second context to a processing module associated with that context. The routing module may determine which portion of the pixel data to send to a specific processing module by reference to the context map or a similar correlation method.

In some embodiments, the routing module 1410 may take several stages to decide how the pixel data should be processed. In particular, the routing module 1410 may look for pixel data of a first context type during a first stage, pixel data of a second context type during a second stage, and so on. For example, the routing module 1410 may send color pixel values within the pixel data to the color processing module 1420a during a first stage, black-and-white pixel values within the pixel data to the black-and-white processing module 1420b during a second stage, and so forth.

Figure 15:
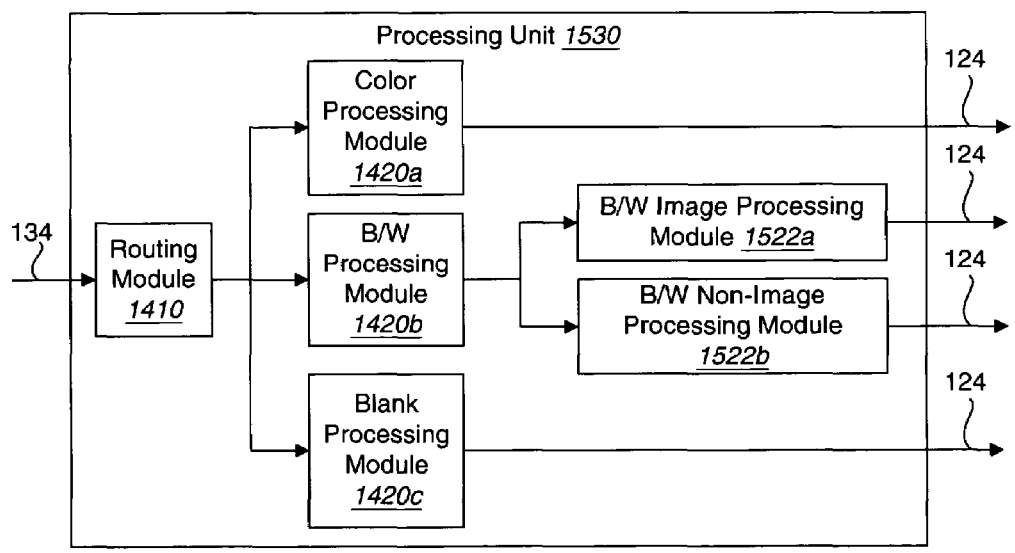
FIG. 15 is a block diagram illustrating an alternative embodiment of the processing unit.

The number of processing modules 1420, 1522 illustrated in FIGS. 14 & 15 is exemplary only. Those skilled in the art will recognize that any number of processing modules 1420 may be included within the processing units 1430 & 1530.

FIG. 15 is a block diagram illustrating alternative embodiments of the processing unit 1530. The embodiment of the processing unit 1530 shown in FIG. 15 includes a black-and-white image processing module 1522a, a black-and-white graphics processing module 1522b and a black-and-white text processing module 1522c. Once the pixel data (or a portion thereof) within an image or ROI is sent to the black-and-white processing module 1420b, the black-and-white processing module 1420*b* may determine whether the pixel data 1232 includes pixel values corresponding to a black-and-white image, a black-and-white graphic or black-and-white text. Pixel values that correspond to a black-and-white image may be sent to the black-and-white image processing module 1522*a*, while pixel values that correspond to a black-and-white graphics may be sent to the black-and-white graphics processing module 1522*b* and pixel values that correspond to black-and-white text may be sent to the black-and-white text processing module. In these embodiments B/W processing module 1420*b* may act as a supplemental routing module to redirect data to the appropriate B/W processing module 1522*a-c*. Similarly, a color image processing module, color graphics processing module and a color text processing module may be employed in embodiments of the present invention.

Figure 16:
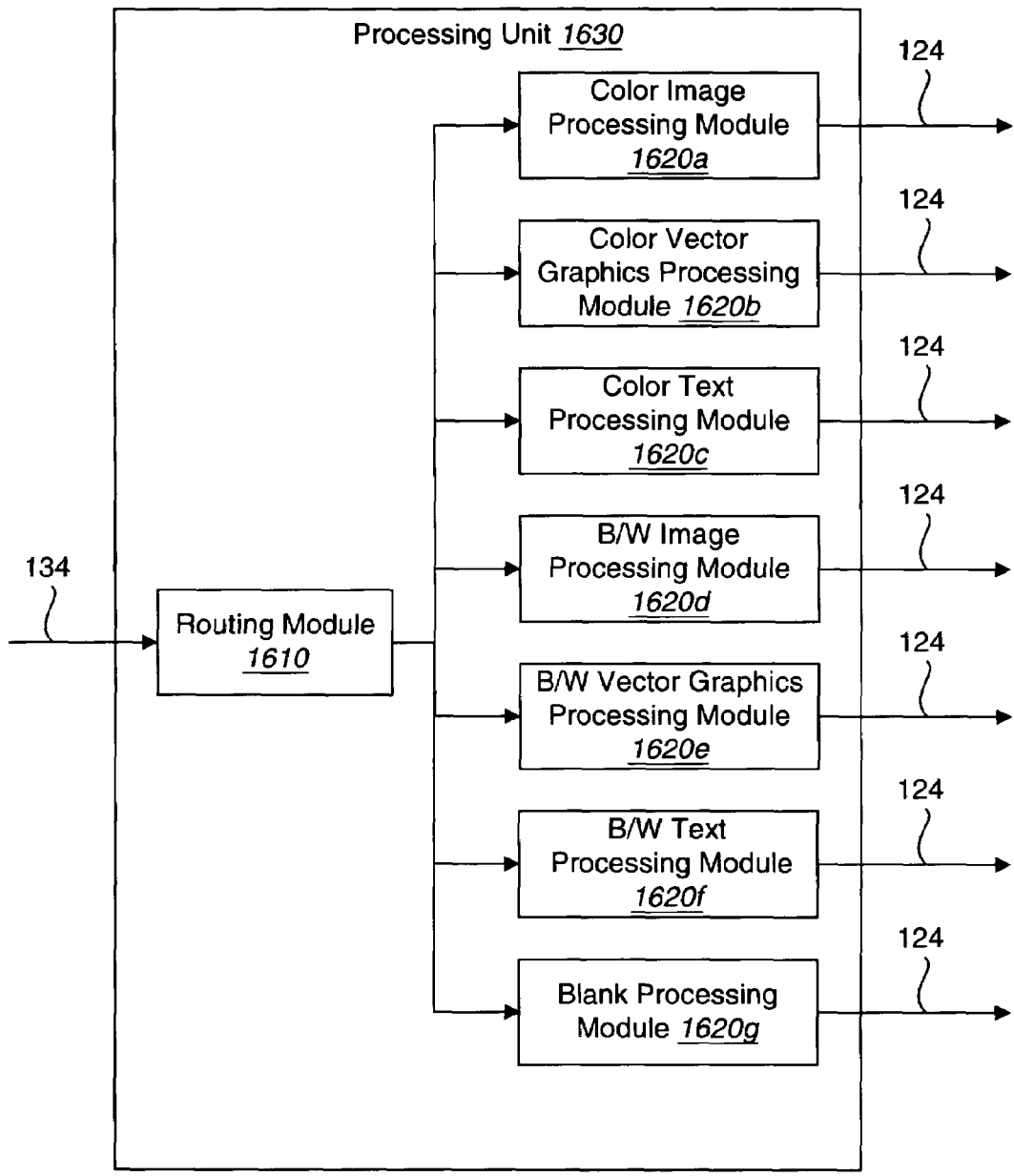
FIG. 16 is a block diagram illustrating another alternative embodiment of the processing unit.

FIG. 16 is a block diagram illustrating further alternative embodiments of the processing unit 1630. In the embodiments shown in FIG. 16, seven processing modules 1620 are included: a color image processing module 1620*a*, a color graphics processing module 1620*b*, a color text processing module 1620*c*, a black-and-white image processing module 1620*d*, a black-and-white graphics processing module 1620*e*, a black-and-white text processing module 1620*f* and a blank processing module 1620*g*.

Suppose a document includes a bitmapped image that includes a textual portion 610. Some embodiments described herein allow the textual portion to be processed separately from the rest of the image. Specifically, the context data generated by the segmentation module may identify the pixel values associated with the textual portion as corresponding to text, even though the textual portion is actually included within a bitmap. Thus, the processing unit may properly process the textual portion using a text processing module (e.g., the color non-image processing module or color text processing module). Of course, the above example applies equally well to other types of images that may include text, such as vector images.

Figure 17:
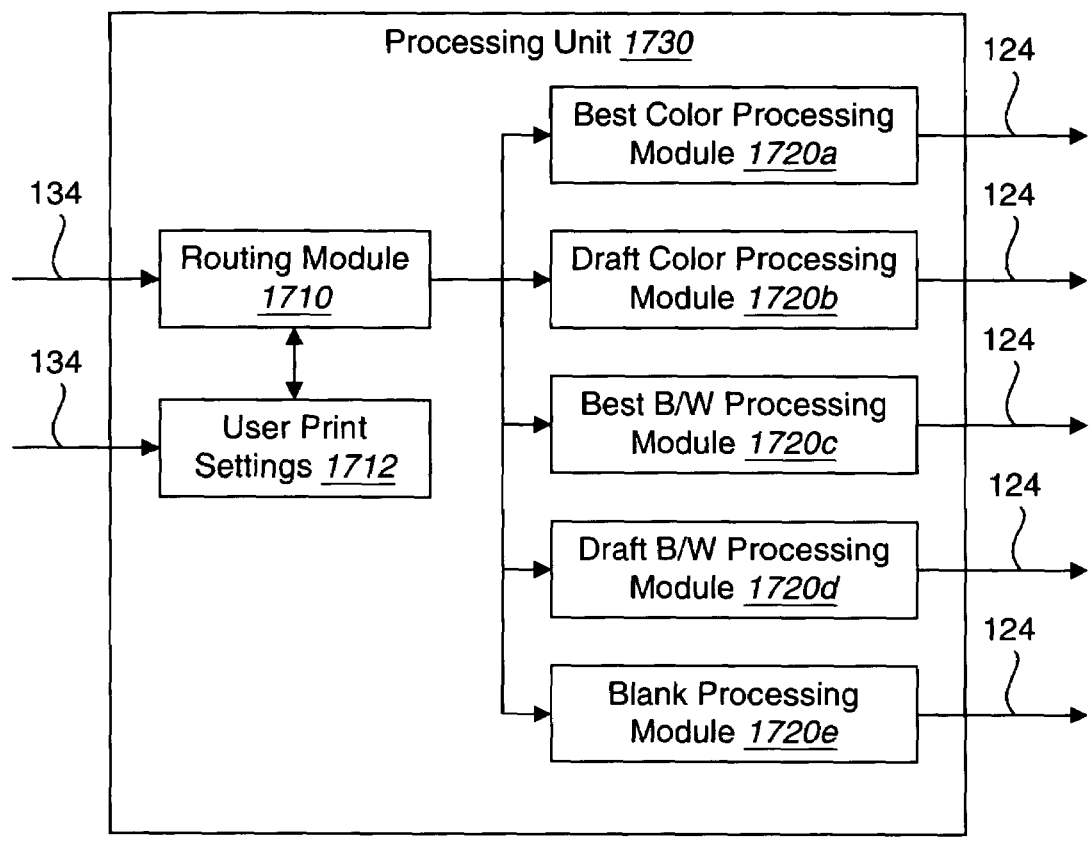
FIG. 17 is a block diagram illustrating another alternative embodiment of the processing unit.

In some embodiments, print data generated by an application (or by the GDI) may include user print settings 1712 or user print settings may be obtained through a user interface. User print settings 1712 may describe the level of quality at which a document is printed. Examples of user print settings 1712 include best, intermediate, draft, etc. FIG. 17 is a block diagram illustrating another alternative embodiment of the processing unit 1730. In the embodiment illustrated in FIG. 17, the processing unit 1730 receives the user print settings 1712 as part of the partitioned pixel data 134 sent from the segmentation module 128 or from a user interface. Alternatively, the processing unit 1730 may receive the user print settings 1712 directly from the application, GDI, etc.

The embodiment of the processing unit 1730 shown in FIG. 17 includes five processing modules 1720: a best color processing module 1720*a*, a draft color processing module 1720*b*, a best black-and-white processing module 1720*c*, a draft black-and-white processing module 1720*d*, and a blank processing module 1720*e*. The best color processing module 1720*a* is capable of processing pixel data 132 that includes color pixel values at a higher level of quality than the draft color processing module 1720*b*. Similarly, the best black-and-white processing module 1720*c* is capable of processing pixel data 132 that includes black-and-white pixel values at a higher level of quality than the draft black-and-white processing module 1720*d*. Of course, the number of processing modules 1720 illustrated in FIG. 17 is exemplary only.

The routing module 1710 may take into consideration the user print settings 1712 when determining how to process the partitioned pixel data 134. For example, suppose the routing module 1710 determines that the pixel data within an image includes only color pixel values. If the user has specified that documents should be printed at the best level of quality, then the routing module may send the pixel data to the best color processing module 1720*a*. Conversely, if the user has specified that documents should be printed at the draft level of quality, then the routing module 1710 may send the pixel data to the draft color processing module 1720*a*.

Figure 18:
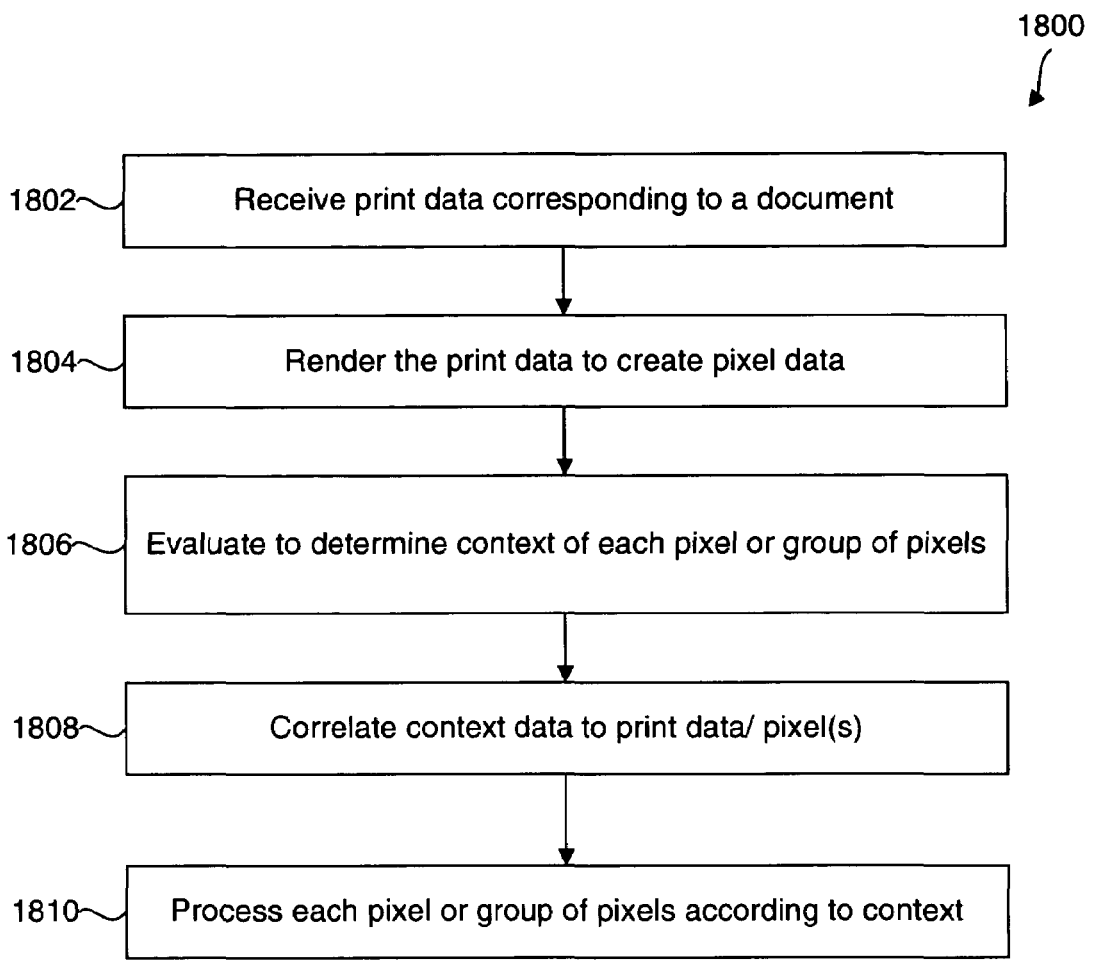
FIG. 18 is a flow diagram illustrating a method for context-based adaptive image processing.

FIG. 18 is a flow diagram illustrating methods 1800 for context-based adaptive image processing. In these methods, print data corresponding to a document to be printed is sent 1802 to a print system component such as a spooler or driver. The print data is then rendered 1804 to create pixel print data. The pixel print data is evaluated 1806 to determine the context of each pixel or group of pixels. Each pixel or group of pixels is then correlated 1808 to a context that is associated with a rendering or processing method. Once correlated, the pixel data may be processed 1810 according to its context.

Figure 19:
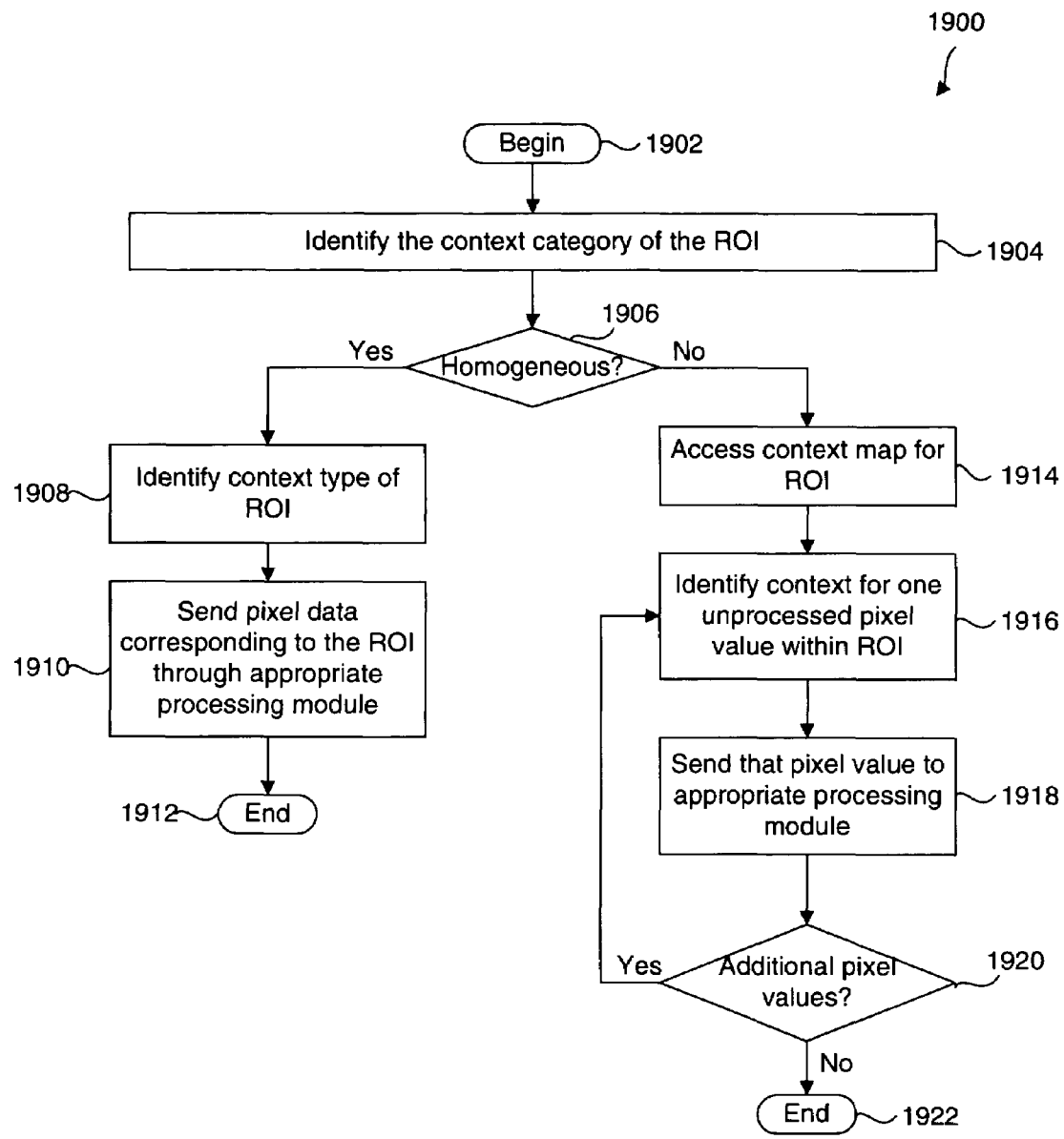
FIG. 19 is a flow diagram illustrating a method for using context data to determine how the pixel data corresponding to an ROI is processed.

FIG. 19 is a flow diagram illustrating a method 1900 for using context data to determine how the pixel data 1232 corresponding to an ROI is processed. The method 1900 begins 1902 by identifying 1904 the context category for the pixel data corresponding to an ROI. If it is determined 1906 that the context category is homogeneous, then the context type of the pixel data corresponding to the ROI is identified 1908. Based on this information, the pixel data corresponding to the ROI is then sent 1910 to the appropriate processing module 1420. The method 1900 may then end 1912.

If in step 1906 it is determined that the context category is heterogeneous, then the context map for the ROI may be accessed 1914. The context type for one unprocessed pixel value within the pixel data is then identified 1916. That pixel value is then sent 1918 to the appropriate processing module 1420. For example, if the pixel value is a black-and-white pixel value (i.e., it corresponds to a black-and-white pixel), then that pixel value may be sent to the black-and-white processing module 1420*b*. Conversely, if the pixel value is a color pixel value, then that pixel value may be sent to the color processing module 1420*a*. It is then determined 1920 whether there are additional unprocessed pixel values in the pixel data corresponding to the ROI. If so, the method 1900 may return to step 1916 and continue as described above. If not, the method 1900 may end 1922.

While many embodiments of the present invention may derive pixel context information from the rendered or rasterized print data, some embodiments may derive some context data from the pre-rasterized print data. In some print formats, such as those using a Page Description Language (PDL), print data elements are coded with specific commands. For example, text may be coded as a text command along with font and character data. As another example, vector graphics may be coded with commands that describe the location, shape, size and other attributes of the graphic. Bitmaps may also be coded with some commands that identify the image size, dimensions and other attributes. In many of these PDLs, the context of an element may be identified by the PDL command itself. Some exemplary PDLs are Adobe Postscript and Hewlett Packard's Printer Command Language (PCL).

When using a PDL as final output, the printer driver may output PDL commands without rasterizing the print data. The PDL commands are rasterized for printing in the printer itself. Therefore, a rasterized image or bitmap of the entire document may not be created on a host computer. However, when documents containing images are printed, the image bitmap is passed through the driver and print stream components to the printer. When these image-containing documents are printed in PDL, embodiments of the present invention may segment the image and identify any non-image elements contained in the image. For example, an image containing text 1103, as shown in FIG. 12 may be segmented and any text or other non-image elements may be identified for processing, such as half-toning, with methods that differ from those used for the rest of the image. In some embodiments, the non-image elements found in an image may be removed from the image and replaced with an equivalent non-image PDL command. In this manner, the non-image element will be processed automatically by the PDL printer.

Other embodiments of the present invention may be used in conjunction with a raster format printer that is capable of printing without using a PDL. When a raster-format printer is used, the driver rasterizes the print data on the client or host computer and sends the rasterized data to the printer. Other printer configurations may also perform rasterization on the host computer. When the print job is rasterized on the host computer, a print stream component, such as a driver or print processor, may analyze the rasterized data using segmentation techniques and other methods as described above.

Figure 20:
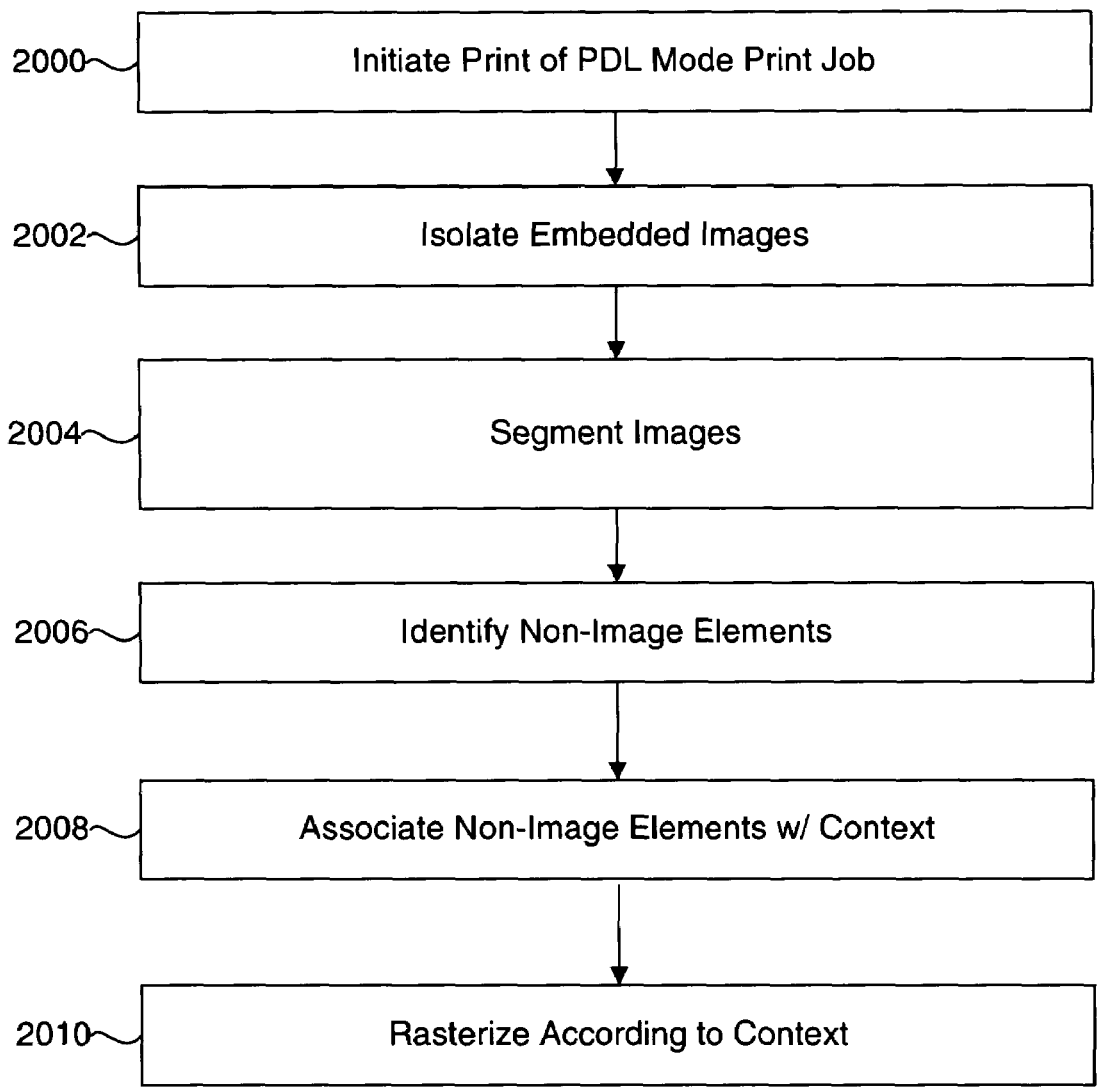
FIG. 20 is a block diagram illustrating a method of context-based print processing.

Some embodiments of the present invention may be described with reference to FIG. 20. In these embodiments, a print job is initiated 2000 as a PDL print job. The print data is sent to the driver or other print stream component where the print data is analyzed and any embedded images are isolated 2002 from other non-image commands. Segmentation 2004 is then performed on these images and any non-image elements that exist in the image, such as text, are identified 2006. These non-image elements are then associated 2008 with the proper context that correlates with a processing method best suited for that element. The image may then be rasterized 2010 according to its context. In some embodiments, the image may be recombined with the other PDL commands from which it was isolated and the entire print job may be rasterized on the host computer and sent to a printer as rasterized data. In other embodiments, the image may be recombined with the other PDL commands from which it was isolated and sent to the PDL printer for rasterization.

Other embodiments of the present invention may be described with reference to FIG. 21. In these embodiments, a PDL print job is initiated 2100 and embedded images are isolated 2102 from other non-image PDL commands. The isolated images are segmented and non-image elements in the image, such as text, are identified 2106 and replaced 2108 with equivalent PDL commands. For example, text within an image may be replaced with a PDL text command. The modified image data is then recombined 2100 with the non-image PDL commands from which it was isolated and the data is modified with the additional PDL commands that replace the non-image elements in the image. The modified data is then sent to the PDL printer for printing.

Further embodiments of the present invention may be described with reference to FIG. 22. In these embodiments, a PDL print job is initiated 2200 and any embedded images are isolated 2202 from non-image PDL commands. The embedded images are then segmented 2204 or otherwise processed to identify 2206 any non-image elements in the image. These non-image elements are then associated 2208 with the proper context for processing such as halftoning. The print data is modified or otherwise coordinated with the context data and sent to a context-aware printer that is capable of reading context data and processing the print data according to context.

Figure 23:
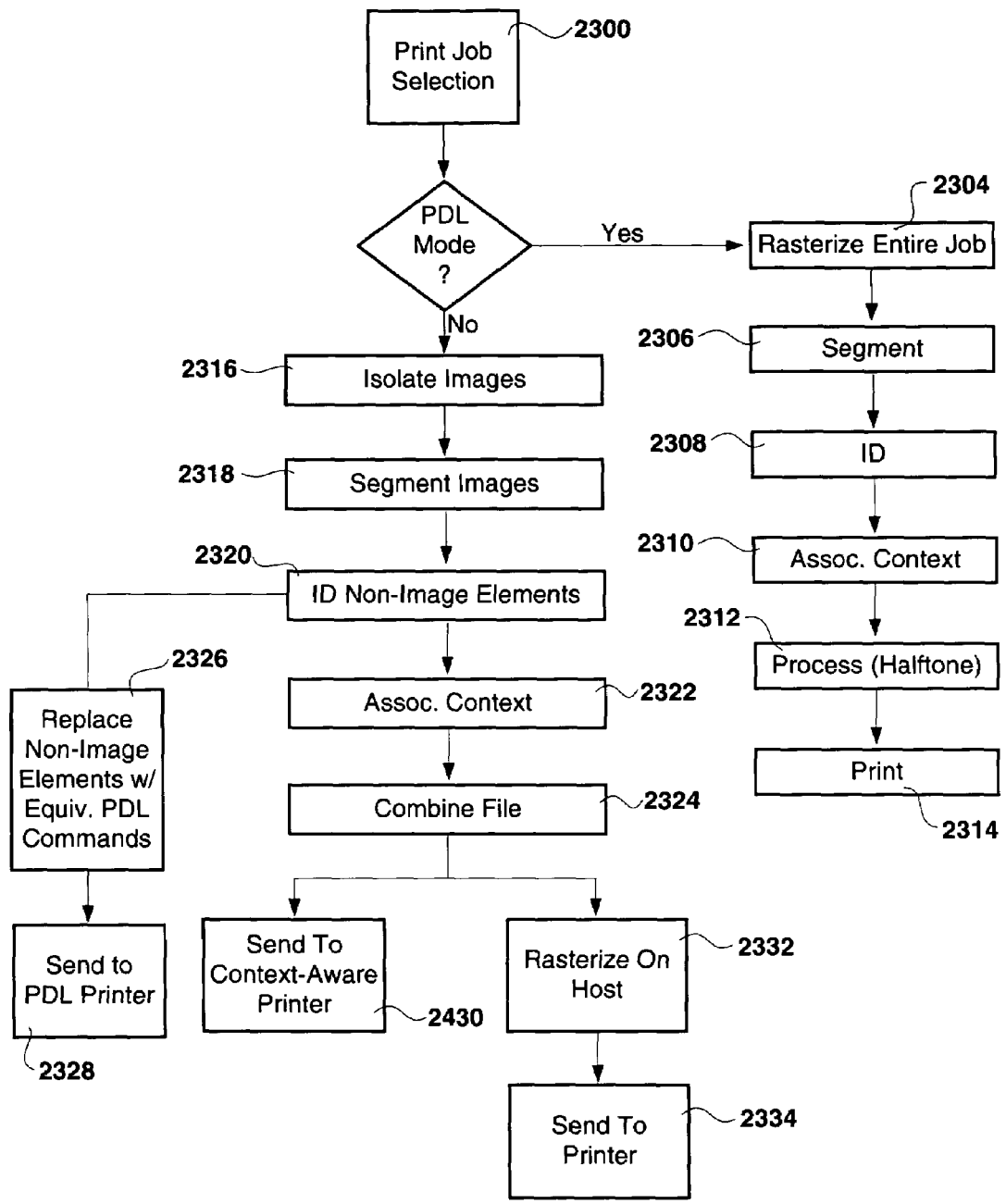
FIG. 23 is a block diagram illustrating alternative methods of context-based print processing.

Still further embodiments of the present invention may be described with reference to FIG. 23. In these embodiments, a print job is initiated 2300 and the print data (including the user selections) is analyzed to determine whether the print job is to be printed in PDL mode or raster mode 2302. If the print job is a raster print job (i.e., a print job configured for a raster printer) the entire print job may be rasterized on the host/client computer 2304. The rasterized data is then segmented 2306 to identify 2308 the various elements of the print data. These elements (i.e., B/W text, vector graphics, color image, etc.) are then associated 2310 with the proper context as explained for several embodiments above. The print data is then processed according to its associated context 2312 and printed 2314.

If the print job is a PDL print job 2302, any images found in the print data may be isolated 2316 from the other non-image PDL commands and segmentation 2318 may be performed on the isolated images. Any non-image elements in the images may be identified 2320 and a context may be associated 2322 with the identified elements. The context data may be embedded in the image file itself or be stored independently of the image file leaving the image file unchanged. The image data may then be recombined 2324 with the non-image PDL commands from which it was isolated. This recombination may result in a file identical to the original PDL print data when context data is stored independently of the print data and accordingly recombination may simply comprise using the original data along with its context data.

Once the file has been associated with context data, the print job may be sent to various destinations. In some embodiments, this data may be sent 2330 to a context-aware printer that can process the context data along with the print job and use the proper processing methods for each print context.

In some embodiments, the combined print file may be rasterized on the host computer 2332 using the proper processing methods and the rasterized data will then be sent to a printer 2334.

In other embodiments of the present invention, once non-image elements have been identified, the print data may be modified to replace non-image elements identified in the image with equivalent PDL commands 2326. This modified print data may then be sent to a PDL printer 2328.

Those of skill in the art would understand that the various illustrative logical blocks, modules, and algorithm steps described in connection with the embodiments disclosed herein may be implemented as computer software, electronic hardware, or combinations of both. To clearly illustrate this interchangeability of hardware and software, various illustrative components, blocks, modules, and steps have been described above generally in terms of their functionality. Whether such functionality is implemented as software or hardware depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for context-based adaptive print job processing using a processing unit, said method comprising:
receiving object-based print commands describing a document to be printed;
identifying first object-based bitmapped image command within said commands;
rasterizing said first object-based bitmapped image command as pixel data;
performing segmentation on said rasterized image pixel data to find pixels in said rasterized image pixel data that can be replaced with non-image PDL commands, wherein said segmentation is based on relationships between pixel values in said pixel data;
associating a non-image context with each of said non-image PDL commands; and
replacing said first object-based bitmapped image command with a second object-based bitmapped image command comprising pixels of said first object-based bitmapped image command that could not be replaced with non-image PDL commands and non-image PDL commands that replace said pixels that can be replaced with non-image PDL commands, wherein said replacing is performed with a processor in said processing unit.

2. A method as described in claim 1 further comprising processing each of said non-image PDL commands according to its context using a process appropriate for the context of each non-image element; and wherein said processed non-image PDL commands and said second object-based bitmapped image command is rasterized on a host computer and sent to a printer capable of raster printing.

3. A method as described in claim 1 further comprising sending said second object-based bitmapped image command and non-image PDL commands to a context-aware PDL printer.

4. A method as described in claim 2 wherein said processing comprises halftoning.

5. A method for context-based adaptive print job processing using a processing unit, said method comprising:
receiving print commands describing a document to be printed;
identifying bitmapped image commands within said print commands;
representing said bitmapped image commands as pixel data;
performing segmentation on said pixel data to find pixels that can be represented with non-image PDL commands, wherein said segmentation is based on relationships between pixel values in said pixel data;
associating a context with each of said non-image PDL commands and said print commands that are not bitmapped image commands; and
replacing said bitmapped image commands with modified object-based bitmapped image commands comprising parts of said bitmapped image commands that cannot be replaced by non-image PDL commands and non-image PDL commands that represent parts of said bitmapped image commands that can be replaced by non-image PDL commands wherein said replacing is performed by a processor in said processing unit.

6. A method as described in claim 5 further comprising processing each non-image PDL command according to its context using a process appropriate for the context of each command; and wherein said processed non-image PDL commands and said print commands are rasterized on a host computer and sent to a printer capable of raster printing.

7. A method as described in claim 5 wherein said print commands comprises an image PDL command.

8. A method as described in claim 5 wherein said print commands comprise rasterized image data.

* * * * *